US008675117B2

(12) United States Patent
Yamano

(10) Patent No.: US 8,675,117 B2
(45) Date of Patent: Mar. 18, 2014

(54) IMAGING UNIT FOR WIDE-ANGLE AND TELEPHOTO ZOOMING AND IMAGING APPARATUS INCORPORATING THE SAME

(75) Inventor: Hiroki Yamano, Tokyo (JP)

(73) Assignee: Sony Corporation, Tokyo (JP)

( * ) Notice: Subject to any disclaimer, the term of this patent is extended or adjusted under 35 U.S.C. 154(b) by 230 days.

(21) Appl. No.: 13/067,521

(22) Filed: Jun. 7, 2011

(65) Prior Publication Data

US 2012/0038816 A1    Feb. 16, 2012

(30) Foreign Application Priority Data

Aug. 16, 2010  (JP) ................................. 2010-181666

(51) Int. Cl.
*H04N 5/225*   (2006.01)
*G02B 15/14*   (2006.01)

(52) U.S. Cl.
USPC ......................................... 348/340; 359/690

(58) Field of Classification Search
USPC ....................................................... 359/690
See application file for complete search history.

(56) References Cited

U.S. PATENT DOCUMENTS

| 5,042,927 | A  | * | 8/1991  | Ogawa et al. ................. 359/683 |
| 5,164,756 | A  | * | 11/1992 | Hirasawa ........................ 396/81 |
| 5,838,374 | A  | * | 11/1998 | Kikuchi ........................ 348/351 |
| 6,349,002 | B1 | * | 2/2002  | Shibayama et al. .......... 359/689 |
| 2004/0184160 | A1 | * | 9/2004 | Nishina et al. ................ 359/690 |
| 2005/0122596 | A1 | * | 6/2005 | Ohashi .......................... 359/690 |
| 2008/0291548 | A1 | * | 11/2008 | Watanabe et al. ............. 359/691 |

FOREIGN PATENT DOCUMENTS

| JP | 2004-012638 | 1/2004  |
| JP | 2005-338740 | 12/2005 |
| JP | 2006-023529 | 1/2006  |
| JP | 2006-308957 | 11/2006 |

* cited by examiner

*Primary Examiner* — Albert Cutler
(74) *Attorney, Agent, or Firm* — Rader, Fishman & Grauer PLLC

(57) ABSTRACT

An imaging unit includes: a first lens group having positive refractive power; a second lens group having negative refractive power; a third lens group having positive refractive power; and a solid-state imaging device that images an optical image formed by the first lens group to the third lens group sequentially arranged from an object side toward an image side, wherein, at zooming from a wide-angle end to a telephoto end, a distance between the first lens group and the second lens group becomes larger and a distance between the second lens group and the third lens group becomes smaller, and a distance from the second lens group to the solid-state imaging device at the wide-angle end is the longest in all zoom positions.

15 Claims, 21 Drawing Sheets

IMAGING UNIT FOR WIDE-ANGLE AND TELEPHOTO ZOOMING AND IMAGING APPARATUS INCORPORATING THE SAME

FIELD

The present disclosure relates to an imaging unit and an imaging apparatus. Specifically, the present disclosure relates to a technical field of an imaging unit that has a high scaling ratio and can provide a sufficiently wider imaging angle of view preferable for a digital still camera, a video camera, a surveillance camera, or the like and an imaging apparatus including the imaging unit.

BACKGROUND

Recently, the market of imaging apparatuses such as digital cameras have been very large and there have been a wide variety of user demands for imaging apparatuses of digital cameras etc. Not only demands for the higher image quality and the smaller and thinner body, but also demands for the higher magnification and the wider angle of imaging units including zoom lenses have been recently very great.

Generally, a positive lead-type optical system with a lens group closest to an object having positive refractive power has an advantage that its scaling factor is made larger, and is often used as a type suitable for higher magnification at the scaling ratio exceeding five times, for example.

Specifically, as a small positive lead-type optical system, an optical system (zoom lens) having a four-group configuration of four lens groups having positive, negative, positive, positive refractive power sequentially from the object side toward an image side has been known (for example, see Patent Document 1 (JP-A-2006-23529), Patent Document 2 (JP-A-2005-338740), Patent Document 3 (Japanese Patent No. 3977150), and Patent Document 4 (JP-A-2006-308957)).

SUMMARY

However, in the optical systems having the four-group configuration of positive, negative, positive, positive refractive power described in Patent Document 1 and Patent Document 3, sufficient higher magnification is not achieved. Further, generally, in the optical systems having the four-group configuration of positive, negative, positive, positive refractive power, for the wider angle, the outer diameter of the lens closest to the object of the first lens group often tends to be larger. Thus, in the optical systems having the four-group configuration of positive, negative, positive, positive refractive power described in Patent Document 1 and Patent Document 3, a sufficiently wider imaging angle of view and downsizing are not realized.

Furthermore, it is necessary to perform good aberration correction for the wider angle and the higher magnification of the optical system, and many lenses are generally used. The optical system described in Patent Document 4 is an optical system with the higher magnification and the wider angle, however, the good aberration correction as above is necessary, and the number of lenses in the first lens group is large and sufficient downsizing has not been realized.

In addition, in the optical systems having the four-group configuration of positive, negative, positive, positive refractive power, the fourth lens group is often provided for focusing, and the size is larger than an optical system having less lens groups like a three-group configuration or the like, and realization of more sufficient downsizing has been an issue.

Therefore, particularly, in the so-called retractable imaging unit in which the lenses are retracted for storage when no imaging is performed, it is extremely difficult to reduce the number of lenses for thinning in the optical axis direction when retracted. Accordingly, development of an imaging unit not only with the higher magnification and the wider angle but also the smaller size is strongly demanded.

Further, in an imaging apparatus using a solid-state imaging device such as a CCD (Charge Coupled Device) or CMOS (Complementary Metal Oxide Semiconductor), it is desirable to use an imaging unit near telecentric at the object side in order to realize uniform image plane illuminance. As the imaging unit, an imaging unit in which the lens group closest to the image side has positive refractive power is preferable.

Accordingly, it is desirable to provide an imaging unit and an imaging apparatus in which the higher magnification, the wider angle, and the smaller size are realized.

An imaging unit according to one embodiment of the present disclosure includes a first lens group having positive refractive power, a second lens group having negative refractive power, a third lens group having positive refractive power, and a solid-state imaging device that images an optical image formed by the first lens group to the third lens group sequentially arranged from an object side toward an image side, at zooming from a wide-angle end to a telephoto end, a distance between the first lens group and the second lens group becomes larger and a distance between the second lens group and the third lens group becomes smaller, and a distance from the second lens group to the solid-state imaging device at the wide-angle end is the longest in all zoom positions.

Therefore, in the imaging unit, the scaling effect of the second lens group and the third lens group that greatly contribute to the scaling effect at zooming becomes greater.

In the imaging unit, it is desirable that an aperture stop is provided between the second lens group and the third lens group and the aperture stop moves integrally with the third lens group at zooming.

No dedicated space for the aperture stop is necessary for zooming.

In the imaging unit, it is desirable that the following condition expression (1) is satisfied $$0.45 < f3/(fw \cdot ft)^{1/2} < 0.70 \tag{1}$$

where
f3: focal length of third lens group
fw: focal length of whole optical system at wide-angle end
ft: focal length of whole optical system at telephoto end
If the imaging unit satisfies the condition expression (1), the refractive power of the third lens group is made proper.

In the imaging unit, it is desirable that a lens surface located closest to the image side in the third lens group is formed to be an aspheric surface.

By forming the lens surface located closest to the image side in the third lens group as an aspheric surface, coma aberration and field curvature are successfully corrected over all zoom positions.

In the imaging unit, it is desirable that the second lens group is formed by sequentially arranging a first negative lens, a second negative lens, and a positive lens from the object side toward the image side.

Since the second lens group is formed by sequentially arranging the first negative lens, the second negative lens, and the positive lens from the object side toward the image side, the principal point position of the second lens group easily becomes closer to the object side.

In the imaging unit, it is desirable that the following condition expression (2) is satisfied.

$$-0.50 < f2/(fw \cdot ft)^{1/2} < -0.30 \qquad (2)$$

where f2: focal length of second lens group fw: focal length of whole optical system at wide-angle end ft: focal length of whole optical system at telephoto end If the imaging unit satisfies the condition expression (2), the refractive power of the second lens group is made proper.

In the imaging unit, it is desirable that the following condition expression (3) is satisfied.

$$-2.0 < f12w/fw < -1.5 \qquad (3)$$

where f12w: combined focal length of first lens group and second lens group at wide-angle end fw: focal length of whole optical system at wide-angle end If the imaging unit satisfies the condition expression (3), the combined refractive power of the first lens group and the second lens group is made proper.

In the imaging unit, it is desirable that the following condition expression (4) is satisfied.

$$0.8 < f23t/ft < 3.5 \qquad (4)$$

where f23t: combined focal length of second lens group and third lens group at telephoto end ft: focal length of whole optical system at telephoto end If the imaging unit satisfies the condition expression (4), the combined refractive power of the second lens group and the third lens group is made proper.

In the imaging unit, it is desirable that the solid-state imaging device is moved in the optical axis direction and focusing is performed.

By moving the solid-state imaging device in the optical axis direction and performing focusing, the lens group for the purpose of focusing becomes unnecessary.

In the imaging unit, it is desirable that the solid-state imaging device is moved in the optical axis direction at zooming and the position of the solid-state imaging device at the wide-angle end is closest to the image side at infinity object focusing.

Since the position of the solid-state imaging device at the wide-angle end is closest to the image side at infinity object focusing, the focus stroke longer at the telephoto end than at the wide-angle end can be secured to a maximum extent at zooming.

In the imaging unit, it is desirable that the second lens group is fixed in the optical axis direction at zooming.

Since the second lens group is fixed in the optical axis direction at zooming, it is not necessary to provide a drive mechanism for moving the second lens group at zooming.

In the imaging unit, it is desirable that, at focusing from infinity object focusing to close-range object focusing, the solid-state imaging device moves from the object side toward the image side.

Since, at focusing from infinity object focusing to close-range object focusing, the solid-state imaging device moves from the object side toward the image side, the focus stroke longer at the telephoto end than at the wide-angle end can be secured to a maximum extent at zooming.

In the imaging unit, it is desirable that the solid-state imaging device is moved in the optical axis direction and focusing is performed, the solid-state imaging device is moved in the optical axis direction at zooming, and, at focusing and zooming, the solid-state imaging device moves in the optical axis direction by a driving force of a stepping motor.

Since, at focusing and zooming, the solid-state imaging device moves in the optical axis direction by the driving force of the stepping motor, the operations of zooming and focusing can be controlled by the same mechanism.

In the imaging unit, it is desirable that the solid-state imaging device is moved in the optical axis direction and focusing is performed, the solid-state imaging device is moved in the optical axis direction at zooming, and, at focusing and zooming, the solid-state imaging device moves in the optical axis direction by a driving force of a linear motor.

Since, at focusing and zooming, the solid-state imaging device moves in the optical axis direction by the driving force of the linear motor, the operations of zooming and focusing can be controlled by the same mechanism.

An imaging apparatus according to one embodiment of the present disclosure includes a zoom lens including a first lens group having positive refractive power, a second lens group having negative refractive power, and a third lens group having positive refractive power sequentially arranged from an object side toward an image side, a solid-state imaging device that images an optical image formed by the zoom lens, an input unit having switches with which operations are performed, and a drive control unit that controls driving of at least the zoom lens, wherein, at zooming from a wide-angle end to a telephoto end, a distance between the first lens group and the second lens group becomes larger and a distance between the second lens group and the third lens group becomes smaller, and a distance from the second lens group to the solid-state imaging device at the wide-angle end is the longest in all zoom positions.

Therefore, in the imaging apparatus, the scaling effect of the second lens group and the third lens group that greatly contribute to the scaling effect at zooming becomes greater.

According to the imaging unit and the imaging apparatus according to the embodiments of the present disclosure having the above described configurations, the higher magnification, the wider angle, and the smaller size can be realized.

DETAILED DESCRIPTION

Figure 1:
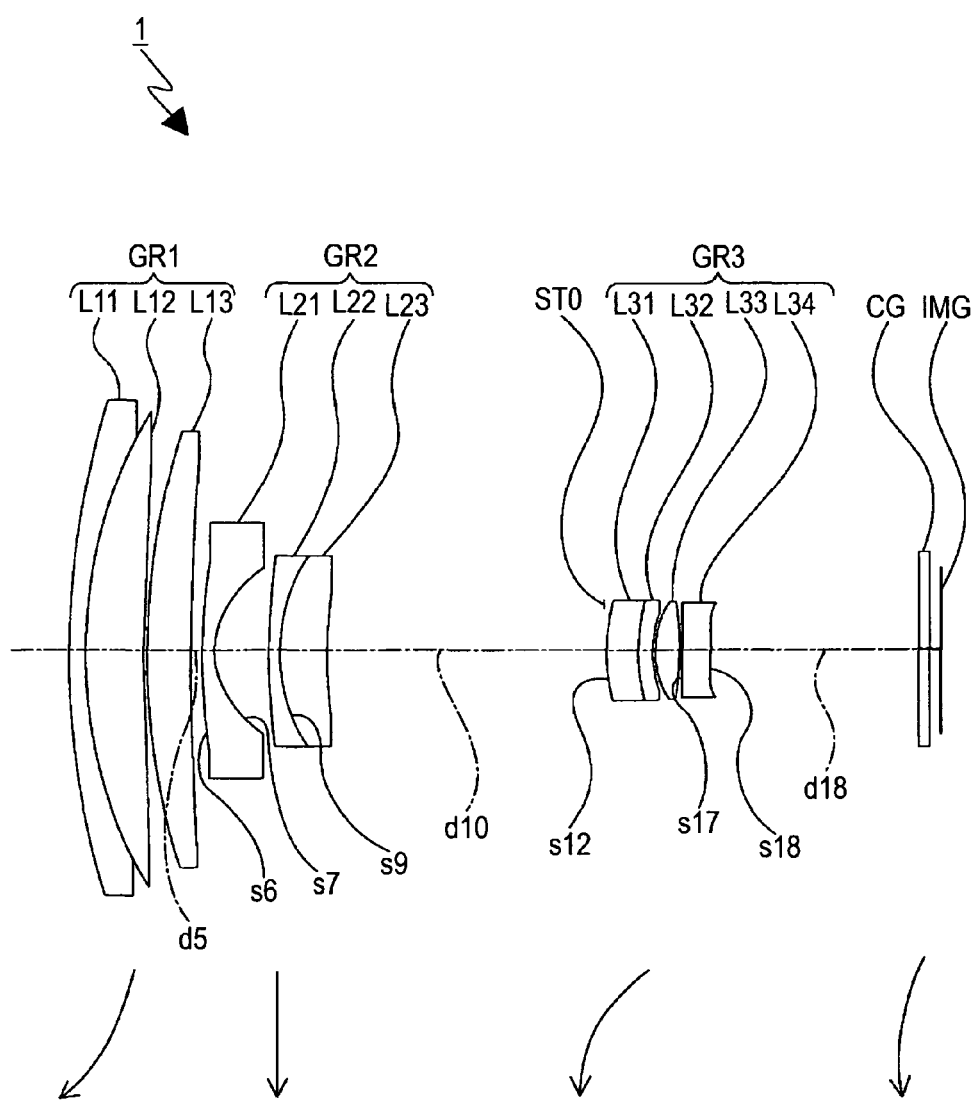
FIG. 1 shows a configuration of an imaging unit of a first embodiment of the present disclosure.

As below, preferred embodiments for implementing an imaging unit and an imaging apparatus according to one embodiment of the present disclosure will be explained.
[Configuration of Imaging Unit]

In an imaging unit according to one embodiment of the present disclosure, a first lens group having positive refractive power, a second lens group having negative refractive power, a third lens group having positive refractive power, and a solid-state imaging device that images an optical image formed by the first lens group to the third lens group are sequentially arranged from an object side toward an image side.

Further, in the imaging unit according to one embodiment of the present disclosure, at zooming from a wide-angle end to a telephoto end, a distance between the first lens group and the second lens group becomes larger and a distance between the second lens group and the third lens group becomes smaller, and a distance from the second lens group to the solid-state imaging device at the wide-angle end is the longest in all zoom positions.

According to the above described configuration, while the wider angle is secured, the higher magnification may be realized by maximizing the scaling effect of the second lens group and the third lens group that greatly contribute to the scaling effect at zooming, and further, downsizing may be realized by shortening the entire length of the whole optical system.

In the imaging unit according to one embodiment of the present disclosure, it is desirable that an aperture stop is provided between the second lens group and the third lens group and the aperture stop moves integrally with the third lens group at zooming.

According to the configuration of the aperture stop, even when the higher magnification is realized, sufficient F-number and peripheral brightness can be secured in all zoom positions. Further, according to the configuration in which the aperture stop integrally moves with the third lens group, it is not necessary to independently move the aperture stop at zooming, and thus, a drive mechanism can be reduced and the imaging unit may be simplified and downsized.

Generally, particularly, in the case of an aperture stop having an opening and closing mechanism for adjustment of an amount of light or the like, the aperture has a drive mechanism of diaphragm blades, a shutter, or the like, and independent movement is not preferable because a space for movement becomes difficult to be secured and the structure of a lens tube becomes complex. Therefore, according to the above described configuration in which the aperture stop is integrally moved with the third lens group, the lens tube in which the imaging unit is provided can be downsized.

In the imaging unit according to one embodiment of the present disclosure, it is desirable that the following condition expression (1) is satisfied.

$$0.45 < f3/(fw \cdot ft)^{1/2} < 0.70 \quad (1)$$

where f3: focal length of third lens group fw: focal length of whole optical system at wide-angle end ft: focal length of whole optical system at telephoto end The condition expression (1) is an expression defining refractive power of the third lens group.

The third lens group is a lens group that greatly contributes to scaling at zooming, and it is important to appropriately set the refractive power of the third lens group for downsizing and higher magnification.

If the value becomes too large over the upper limit of the condition expression (1), the refractive power of the third lens group becomes too small, it becomes necessary to extend the entire length for realization of the higher magnification of the optical system, and it may be impossible to realize downsizing.

Contrary, if the value becomes too small over the lower limit of the condition expression (1), the refractive power of the third lens group becomes too large and it becomes difficult to correct aberration generated in the third lens group, and, particularly, the aberration fluctuation becomes too large at zooming and image quality is deteriorated.

Therefore, if the imaging unit satisfies the condition expression (1), the refractive power of the third lens group is made proper, and the higher magnification and the downsizing may be realized and the image quality may be improved.

In the imaging unit according to one embodiment of the present disclosure, it is desirable that a lens surface located closest to the image side in the third lens group is formed to be an aspheric surface.

By forming the lens surface located closest to the image side in the third lens group as an aspheric surface, coma aberration and field curvature can be successfully corrected over all zoom positions, and image quality can be improved.

Particularly, in the case where the solid-state imaging device is made movable and focusing is performed, coma aberration and field curvature can be successfully corrected for all object distances and good image quality can be obtained.

In the imaging unit according to one embodiment of the present disclosure, it is desirable that the second lens group is formed by sequentially arranging a first negative lens, a second negative lens, and a positive lens from the object side toward the image side.

The second lens group is a lens group that greatly contributes to scaling at zooming like the third lens group, and it is important to appropriately set the refractive power of the second lens group for downsizing and higher magnification. Further, the second lens group is the most important lens group for the wider angle of the optical system and downsizing of the lens diameter of the optical system, and appropriate setting of the lens configuration and the refractive power of the second lens group is important for all of the downsizing, the higher magnification, the wider angle, and the higher image quality.

According to the configuration in which the second lens group is formed by sequentially arranging the first negative lens, the second negative lens, and the positive lens from the object side toward the image side, the principal point position becomes easier to be made closer to the object side, and an entrance pupil position at the wide-angle end becomes easier to be located at the object side. Therefore, for example, even when the wider angle such that the angle of view (a half angle of view at the wide-angle end) exceeds 38° is realized, the diameter of the first lens group can be made smaller, and accordingly, the configuration contributes to downsizing of the lens diameter of the whole optical system.

In this manner, by forming the second lens group by sequentially arranging the first negative lens, the second negative lens, and the positive lens from the object side toward the image side, the wider angle and downsizing may be realized.

In the imaging unit according to one embodiment of the present disclosure, it is desirable that the following condition expression (2) is satisfied.

$$-0.50 < f2/(fw \cdot ft)^{1/2} < -0.30 \quad (2)$$

where
f2: focal length of second lens group
fw: focal length of whole optical system at wide-angle end
ft: focal length of whole optical system at telephoto end The condition expression (2) is an expression defining refractive power of the second lens group.

If the value becomes too small over the lower limit of the condition expression (2), the refractive power of the second lens group becomes too small, it becomes necessary to increase the diameter of the lens located closest to the object side of the first lens group and the entire length, and it may be impossible to realize downsizing.

Contrary, if the value becomes too large over the upper limit of the condition expression (2), the refractive power of the second lens group becomes too large, and it becomes difficult to appropriately correct off-axis aberration at the wide-angle end and axial aberration at the telephoto end and image quality is deteriorated.

Therefore, if the imaging unit satisfies the condition expression (2), the refractive power of the second lens group is made proper, and the downsizing and the higher image quality can be realized.

Note that, in the imaging unit, it is most preferable that the first negative lens located at the object side in the second lens group is formed as an aspheric lens. By forming the first negative lens as the aspheric lens, particularly, generation of the off-axis aberration at the wide-angle end can be suppressed to the utmost limit, and image quality can be further improved.

Further, it is also desirable that the positive lens located closest to the image side in the second lens group is formed as an aspheric lens. By forming the positive lens as the aspheric lens, correction of the off-axis aberration at the wide-angle end and the axial aberration the telephoto end can be performed more effectively.

In the imaging unit according to one embodiment of the present disclosure, it is desirable that the following condition expression (3) is satisfied.

$$-2.0 < f12w/fw < -1.5 \quad (3)$$

where
f12w: combined focal length of first lens group and second lens group at wide-angle end
fw: focal length of whole optical system at wide-angle end The condition expression (3) is an expression defining combined refractive power of the first lens group and the second lens group at wide-angle end.

As described above, for example, when the wider angle such that the angle of view (a half angle of view at the wide-angle end) exceeds 38° is realized, reduction of the lens diameter of the first lens group greatly contributes to downsizing of the lens diameter of the whole optical system. Specifically, the combined refractive power of the first lens group and the second lens group at wide-angle end most greatly contributes to downsizing in the radial direction of the optical system.

Therefore, if the value becomes too small over the lower limit of the condition expression (3), the combined refractive power of the first lens group and the second lens group becomes too small, and, when the wider angle is realized, the diameter of the lens located closest to the object side in the first lens group becomes larger.

Contrary, if the value becomes too large over the upper limit of the condition expression (3), the combined refractive power of the first lens group and the second lens group becomes too large, and, particularly, the off-axis aberration at the wide-angle end becomes larger. Accordingly, image quality is deteriorated or the refractive power of the first lens group becomes too small, and, when the higher magnification is realized, the entire length of the optical system becomes longer and the F-number at the telephoto end becomes too dark, and downsizing may be hindered and the higher image quality may not be realized.

Therefore, if the imaging unit satisfies the condition expression (3), while the higher magnification is secured, the downsizing may be realized and the higher image quality may be realized.

In the imaging unit according to one embodiment of the present disclosure, it is desirable that the following condition expression (4) is satisfied.

$$0.8 < f23t/ft < 3.5 \quad (4)$$

where
f23t: combined focal length of second lens group and third lens group at telephoto end
ft: focal length of whole optical system at telephoto end The condition expression (4) is an expression defining combined refractive power of the second lens group and the third lens group at the telephoto end.

If the value becomes too large over the upper limit of the condition expression (4), the combined refractive power of the second lens group and the third lens group becomes too small, and the entire length of the optical system becomes longer and downsizing becomes difficult to be realized.

Contrary, if the value becomes too small over the lower limit of the condition expression (4), the combined refractive power of the second lens group and the third lens group becomes too large, and, particularly, the axial aberration and chromatic aberration of magnification at the telephoto end become larger, and the image quality is deteriorated.

Therefore, if the imaging unit satisfies the condition expression (4), the downsizing and the higher image quality may be realized.

In the imaging unit according to one embodiment of the present disclosure, it is desirable that the solid-state imaging device is moved in the optical axis direction and focusing is performed.

By moving the solid-state imaging device in the optical axis direction and performing focusing, the lens group for focusing may be reduced and focus sensitivity may be set to 1.0, and thereby, the focus stroke can be made shorter than in the case where focusing is performed by the lens group. Specifically, for example, in the case where focusing is performed by the fourth lens group in the type of a four-group configuration of four lens groups having positive, negative, positive, positive, the focus sensitivity often becomes about 0.3 to 0.7. Therefore, by focusing the solid-state imaging device, the space necessary for focusing can be reduced by 30% to 70% from the interior of the lens tube, and the secured space can be distributed for securement of the stroke for zooming according to need.

In this manner, by moving the solid-state imaging device in the optical axis direction and performing focusing, downsizing may be realized and the higher magnification may be realized.

In the imaging unit according to one embodiment of the present disclosure, it is desirable that the solid-state imaging device is moved in the optical axis direction at zooming and the position of the solid-state imaging device at the wide-angle end is closest to the image side at infinity object focusing.

Generally, the image magnification in the optical system becomes higher toward the telephoto end side than that at the wide-angle end, and the focus stroke for focusing from infinity object focusing to close-range object focusing often becomes longer toward the telephoto end side than that at the wide-angle end.

Accordingly, as described above, according to the configuration in which the position of the solid-state imaging device at the wide-angle end is closest to the image side at zooming at infinity object focusing, the focus stroke longer at the telephoto end side than at the wide-angle end can be secured at zooming to a maximum extent. As a result, the focus stroke necessary in the lens tube can be made shorter.

Therefore, downsizing of the optical system can be realized in the imaging unit.

In the imaging unit according to one embodiment of the present disclosure, it is desirable that the second lens group is fixed in the optical axis direction at zooming.

Since the second lens group is fixed in the optical axis direction at zooming, it is not necessary to provide a drive mechanism for moving the second lens group at zooming, or it is not necessary to secure the movement stroke of the second lens group in a cam member and the like of the drive mechanism.

Therefore, the structure of the lens tube can be greatly simplified and downsized, and downsizing of the imaging unit may be realized.

In the imaging unit according to one embodiment of the present disclosure, it is desirable that, at focusing from infinity object focusing to close-range object focusing, the solid-state imaging device moves from the object side toward the image side.

As described above, generally, image magnification in the optical system becomes higher toward the telephoto end side than that at the wide-angle end, and the focus stroke for focusing from infinity object focusing to close-range object focusing often becomes longer toward the telephoto end side than that at the wide-angle end.

Accordingly, as described above, according to the configuration in which, at focusing from infinity object focusing to close-range object focusing, the solid-state imaging device moves from the object side toward the image side, the focus stroke longer at the telephoto end side than at the wide-angle end can be secured at zooming to a maximum extent, and the focus stroke necessary in the lens tube can be made shorter.

Therefore, downsizing of the optical system can be realized in the imaging unit.

In the imaging unit according to one embodiment of the present disclosure, it is desirable that, at focusing and zooming, the solid-state imaging device moves in the optical axis direction by a driving force of a stepping motor.

According to the configuration in which the solid-state imaging device moves in the optical axis direction by the driving force of the stepping motor, complex movements of both zooming and focusing can be controlled using the same mechanism.

Therefore, the structure of the lens tube can be simplified and downsized, and reliability of the movements may be improved because the driving accuracy is higher than that in the control method by rotating a cam member.

In the imaging unit according to one embodiment of the present disclosure, it is desirable that, at focusing and zooming, the solid-state imaging device moves in the optical axis direction by a driving force of a linear motor.

According to the configuration in which the solid-state imaging device moves in the optical axis direction by the driving force of the linear motor, complex movements of both zooming and focusing can be controlled using the same mechanism.

Therefore, the structure of the lens tube can be simplified and downsized, and reliability of the movements may be improved because the driving accuracy is higher than that in the control method by rotating a cam member.

Note that, in the imaging unit according to the embodiment of the present disclosure, the solid-state imaging device is moved in the optical axis direction at zooming and focusing, and the solid-state imaging device may be integrally moved with an infrared cut filter or an optical low-pass filter provided near the solid-state imaging device, a cover glass sealing the solid-state imaging device, or the like.

Generally, the solid-state imaging device often takes a form sealed by a cover glass or the like in advance or with which an infrared cut filter or an optical low-pass filter is integrally provided as a package. Therefore, even in the case where the solid-state imaging device is integrally moved with the infrared cut filter, the optical low-pass filter, the cover glass, or the like, the above described advantage in the configuration in which the solid-state imaging device is moved at focusing and zooming is not lost.

[Numeric Value Examples of Imaging Unit]

As below, specific embodiments of the imaging unit of the present disclosure and numeric value examples in which specific numeric values are applied to the embodiments will be explained with reference to the drawings and tables.

Note that meanings of signs shown in the following respective tables and explanation etc. are as follows.

"si" refers to an ith surface counted from the object side to the image side, "ri" refers to a radius of curvature of the ith surface, "di" refers to an axial surface distance (lens center thickness or air distance) between the ith surface and the (i+1)th surface, "ni" refers to a refractive index on the d-line ($\lambda$=587.6 nm) of the lens or the like starting from the ith surface, and "vi" refers to an Abbe number on the d-line of the lens or the like starting from the ith surface.

With respect to "surface number", "ASP" indicates that the surface is an aspheric surface, with respect to "radius of curvature", "INFINITY" indicates that the surface is a flat surface, and, with respect to "surface distance", "(di)" indicates a variable distance.

"K" refers to a conic constant, and "A", "B", "C", "D" refer to aspherical coefficients of the order of 4, 6, 8, 10, respectively.

"f" refers to a focal length of a whole lens system, "FNO" refers to an F-number (open F-number), and "$\omega$" refers to a half angle of view (unit: °).

Note that, in the following respective tables showing aspherical coefficients, "E–n" is an exponential expression to the base 10, i.e., "$10^{-n}$", and "0.12345E–05" expresses "$0.12345\times10^{-5}$", for example.

In some of the zoom lenses used in the respective embodiments, the lens surface is formed as an aspheric surface. Given that the distance from an apex of the lens surface in the optical axis direction is "x", a height in a direction orthogonal to the optical axis direction is "y", and a paraxial curvature at the lens apex is "c", the aspheric shape is defined by the following equation.

$$x = \frac{cy^2}{1+\{1-(1+K)c^2y^2\}^{1/2}} + Ay^4 + By^6 + \ldots$$

First Embodiment

FIG. 1 shows a lens configuration of an imaging unit 1 in the first embodiment of the present disclosure.

The imaging unit 1 includes a first lens group GR1 having positive refractive power, a second lens group GR2 having negative refractive power, a third lens group GR3 having positive refractive power, and a solid-state imaging device IMG that images an optical image by the first lens group GR1 to the third lens group GR3 sequentially arranged from an object side toward an image side.

Figure 2:
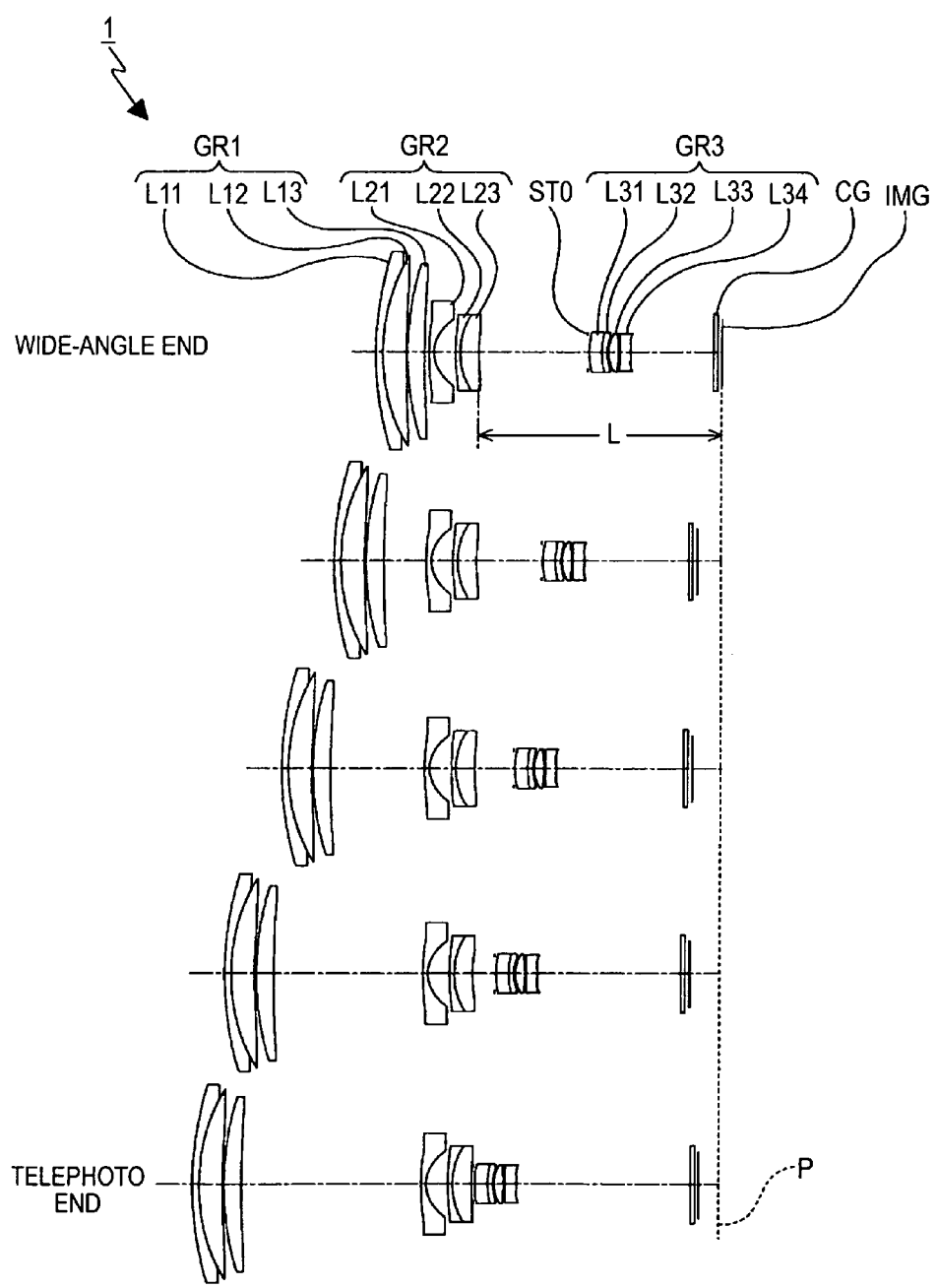
FIG. 2 shows movements of lens groups and a solid-state imaging device at zooming between a wide-angle end and a telephoto end with respect to the imaging unit of the first embodiment of the present disclosure.

In the imaging unit 1, as shown in FIG. 2, at zooming from a wide-angle end to a telephoto end, the first lens group GR1 moves toward the object side to increase a distance to the second lens group GR2 and the third lens group GR3 moves toward the object side to decrease a distance to the second lens group GR2. The second lens group GR2 is fixed in an optical axis direction at zooming from the wide-angle end to the telephoto end.

At zooming from the wide-angle end to the telephoto end, the solid-state imaging device IMG is moved in the optical axis direction and the solid-state imaging device IMG is located in a position P closest to the image side at the wide-angle end.

Further, in the imaging unit 1, a distance L from the second lens group GR2 to the solid-state imaging device IMG at the wide-angle end is set to the longest in all zoom positions.

Furthermore, in the imaging unit 1, the solid-state imaging device IMG is moved in the optical axis direction and focusing is performed, and, at focusing from infinity object focusing to close-range object focusing, the solid-state imaging device IMG moves from the object side toward the image side.

In the imaging unit 1, a scaling ratio is 9.41×.

The first lens group GR1 includes a cemented lens formed by cementing a negative lens L11 having a meniscus shape with its convex surface directed toward the object side and a first positive lens L12 having a meniscus shape with its convex surface directed toward the object side, and a second positive lens L13 having a meniscus shape with its convex surface directed toward the object side sequentially arranged from the object side toward the image side.

The second lens group GR2 includes a first negative lens L21 having a meniscus shape with its concave surface directed toward the image side, and a cemented lens formed by cementing a second negative lens L22 having a meniscus shape with its concave surface directed toward the object side and a positive lens L23 having a meniscus shape with its convex surface directed toward the object side sequentially arranged from the object side toward the image side.

The third lens group GR3 includes a cemented lens formed by cementing a first positive lens L31 having a meniscus shape with its convex surface directed toward the object side and a first negative lens L32 having a meniscus shape with its concave surface directed toward the object side, a second positive lens L33 having a biconvex shape, and a second negative lens L34 with its concave surface directed toward the object side sequentially arranged from the object side toward the image side.

A cover glass. CG is provided between the third lens group GR3 and an image surface IMG.

An aperture stop STO is provided between the second lens group GR2 and the third lens group GR3, provided near the first positive lens L31 of the third lens group GR3, and moves integrally with the third lens group GR3 in the optical axis direction.

Table 1 shows lens data of numeric value example 1 in which specific numeric values are applied to the imaging unit 1 in the first embodiment.

TABLE 1

| si | ri | di | ni | vi |
|---|---|---|---|---|
| 1 | 39.30 | 0.800 | 1.84666 | 23.780 |
| 2 | 22.67 | 2.738 | 1.61800 | 63.390 |
| 3 | 150.00 | 0.150 | | |
| 4 | 33.95 | 2.000 | 1.80420 | 46.503 |
| 5 | 135.52 | (d5) | | |
| 6 (ASP) | 27.27 | 0.500 | 1.85135 | 40.100 |
| 7 (ASP) | 4.32 | 2.600 | | |
| 8 | 45.38 | 0.500 | 1.80420 | 46.503 |
| 9 (ASP) | 8.31 | 2.200 | 2.00170 | 19.324 |
| 10 | 24.02 | (d10) | | |
| STO | INFINITY | 0.100 | | |
| 12 (ASP) | 7.12 | 1.500 | 1.83441 | 37.285 |
| 13 | 9.19 | 0.637 | 1.94595 | 17.980 |
| 14 | 5.86 | 0.100 | | |
| 15 | 4.35 | 1.200 | 1.59201 | 67.023 |
| 16 | −12.80 | 0.100 | | |
| 17 (ASP) | −20.19 | 1.300 | 1.61881 | 63.855 |
| 18 (ASP) | −32784.41 | (d18) | | |
| 19 | INFINITY | 0.500 | 1.51680 | 64.200 |
| 20 | INFINITY | 0.500 | | |
| IMG | INFINITY | | | |

In the imaging unit 1, both surfaces (6th surface and 7th surface) of the first negative lens L21 of the second lens group GR2, the cemented surface (9th surface) of the cemented lens of the second lens group GR2, the object side surface (12th surface) of the first positive lens L31 of the third lens group GR3, and both surfaces (17th surface and 18th surface) of the second negative lens L34 of the third lens group GR3 are formed to be aspheric surfaces. Table 2 shows the aspherical coefficients A, B, C, D of the order of 4, 6, 8, 10 of the aspheric surfaces in numeric value example 1 with the conic constants K.

TABLE 2

| si | K | A | B | C | D |
|---|---|---|---|---|---|
| 6 | 1.57058E+01 | 1.09101E−04 | −3.21578E−05 | 6.90328E−07 | −6.62494E−09 |
| 7 | −1.65981E−01 | 7.72111E−04 | −6.37592E−06 | 1.77697E−06 | −2.77422E−07 |
| 9 | −4.59588E+00 | −4.84903E−04 | −2.47205E−05 | 2.66467E−06 | −1.41192E−07 |
| 12 | −1.18932E+00 | −3.31410E−04 | −3.10305E−05 | −7.16141E−06 | 9.71880E−07 |
| 17 | −6.87115E+01 | 4.11927E−03 | 1.23847E−04 | 5.75176E−06 | −3.41203E−06 |
| 18 | −2.08701E+29 | 7.06299E−03 | 2.49364E−04 | 3.85402E−05 | 1.53663E−07 |

Table 3 shows F-numbers FNO and half angles of view ω in a wide-angle end state (f=4.38), an intermediate focal length state (f=13.43), and a telephoto end state (f=41.23) of numeric value example 1.

TABLE 3

|  | Wide-angle end | Intermediate focal length | Telephoto end |
|---|---|---|---|
| f | 4.38 | 13.43 | 41.23 |
| FNO | 3.49 | 4.78 | 6.24 |
| ω (°) | 41.47 | 16.08 | 5.37 |

In the imaging unit 1, at scaling between the wide-angle end state and the telephoto end state, the surface distance d5 between the first lens group GR1 and the second lens group GR2, the surface distance d10 between the second lens group GR2 and the third lens group GR3 (aperture stop STO), and the surface distance d18 between the third lens group GR3 and the cover glass CG change. Table 4 shows variable distances in the wide-angle end state (f=4.38), the intermediate focal length state (f=13.43), and the telephoto end state (f=41.23) in numeric value example 1.

TABLE 4

|  | Wide-angle end | Intermediate focal length | Telephoto end |
|---|---|---|---|
| f | 4.38 | 13.43 | 41.23 |
| d5 | 0.500 | 10.786 | 20.766 |
| d10 | 12.508 | 4.411 | 0.150 |
| d18 | 9.567 | 14.505 | 19.909 |

Figure 3:
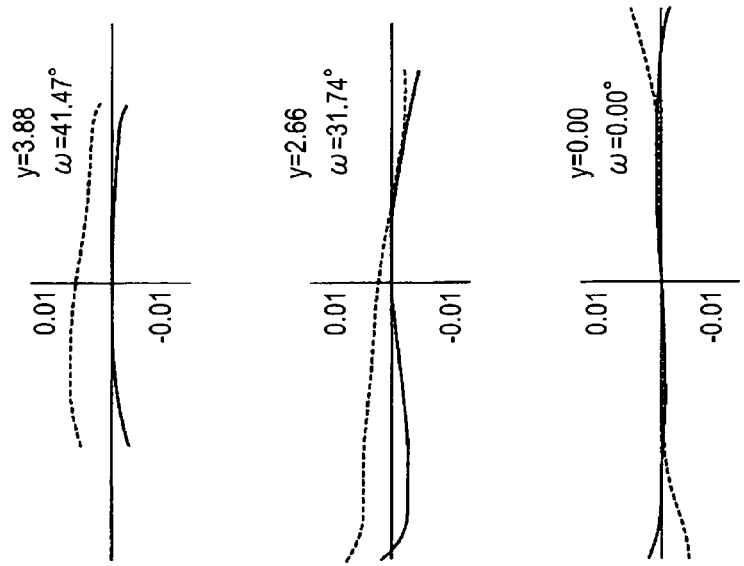
FIG. 3 shows aberration charts of numeric value examples in which specific numeric values are applied to the first embodiment together with FIGS. 4 and 5, and shows spherical aberration, astigmatism, distortion, and lateral aberration in a wide-angle end state.
Figure 3:
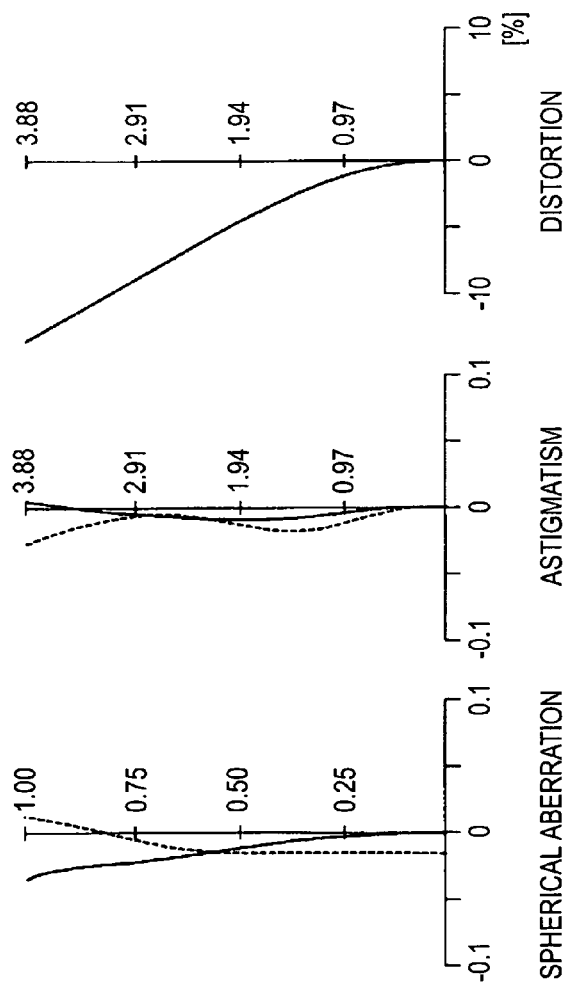
Figure 4:
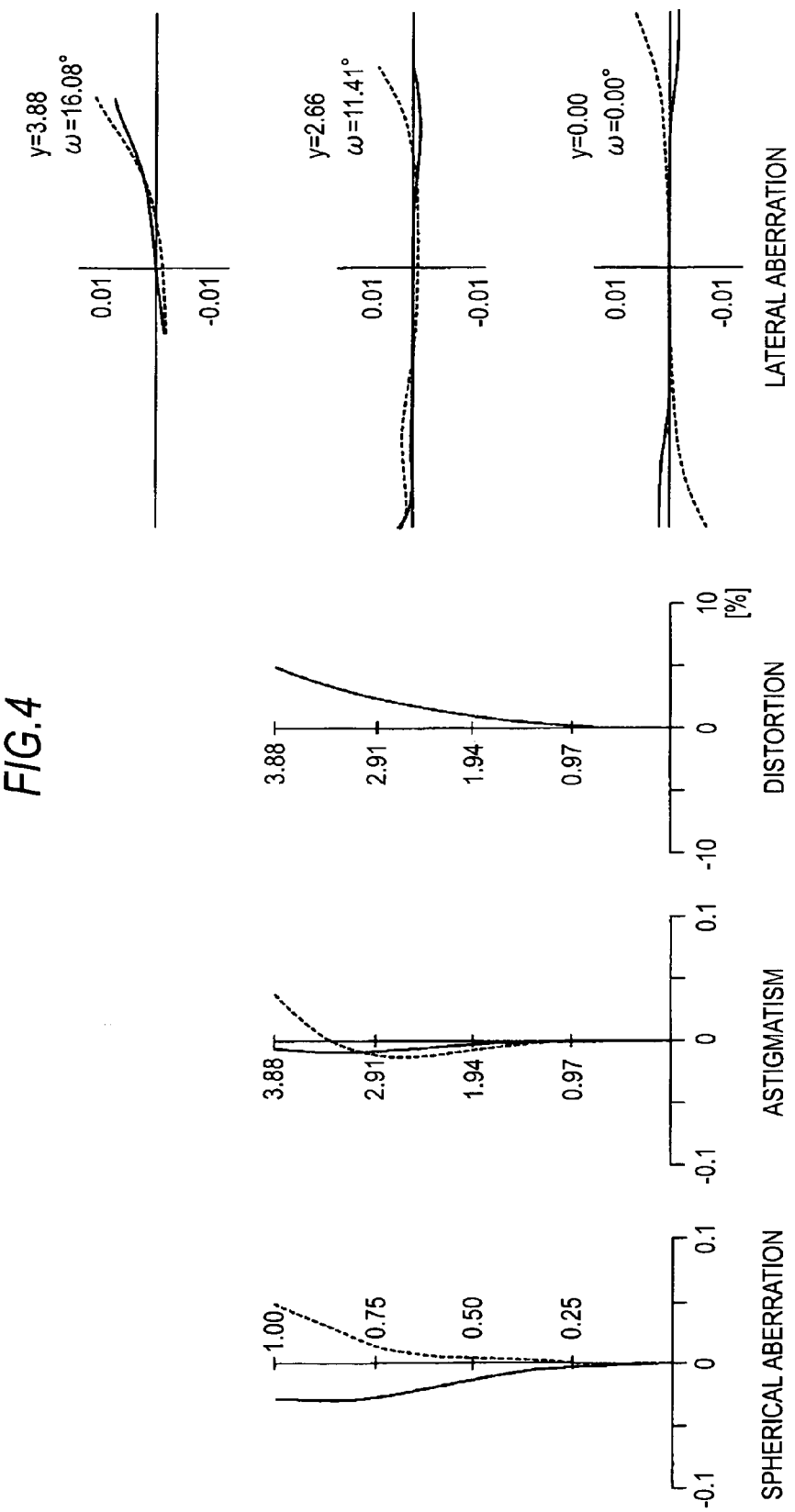
FIG. 4 shows spherical aberration, astigmatism, distortion, and lateral aberration in an intermediate focal length state.
Figure 5:
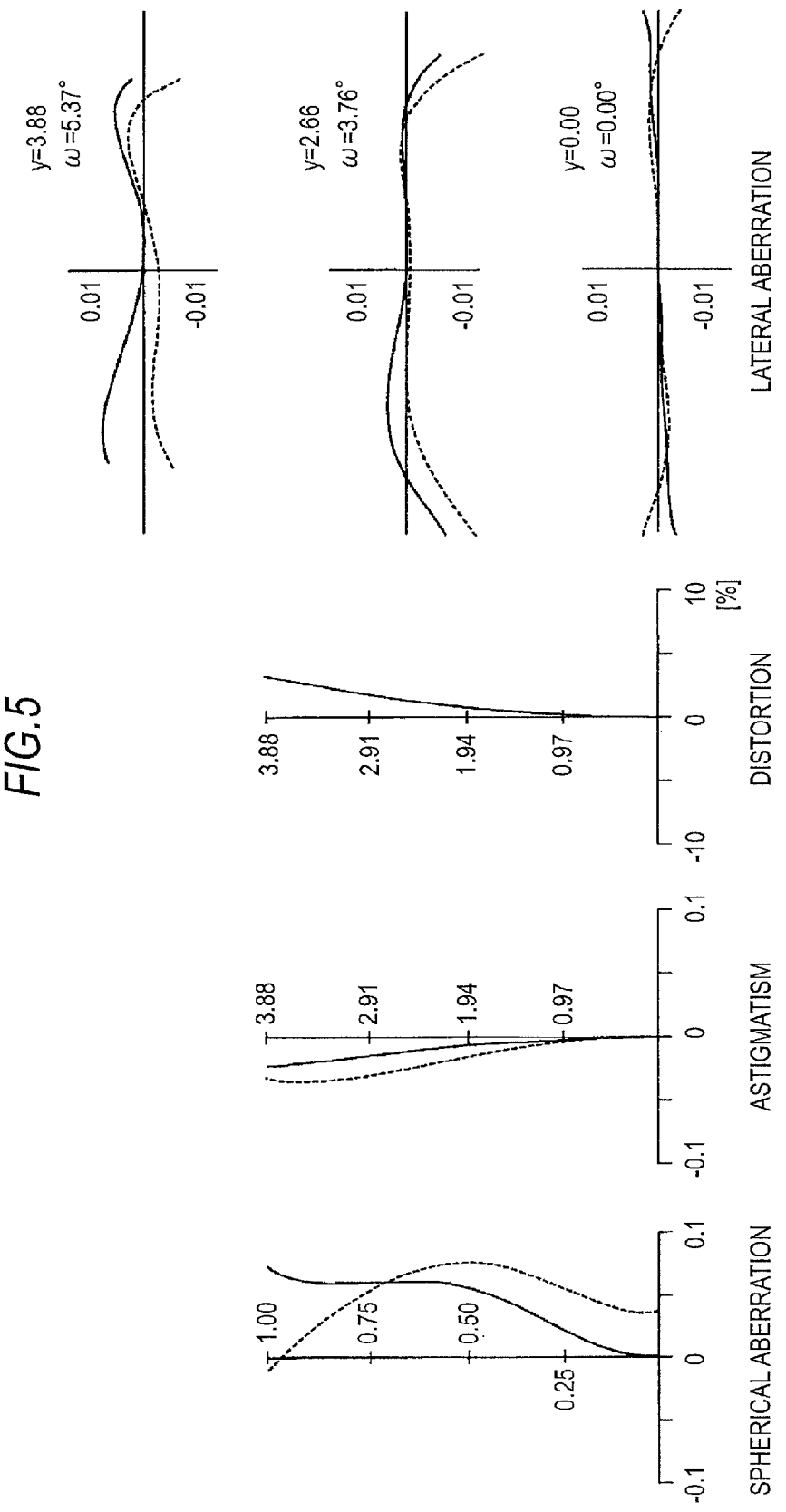
FIG. 5 shows spherical aberration, astigmatism, distortion, and lateral aberration in a telephoto end state.

FIGS. 3 to 5 show various aberration charts in an infinite focusing condition of numeric value example 1, and show various aberration charts in the wide-angle end state, the intermediate focal length state, and the telephoto end state, respectively.

In FIGS. 3 to 5, in spherical aberration charts, the solid line shows values on d-line (wavelength 587.6 nm) and the broken line shows values on g-line (wavelength 435.8 nm), respectively, in astigmatism charts, the solid line shows values on a sagittal image surface and the broken line shows values on a meridional image surface, respectively, and, in lateral aberration charts, the solid line shows values on e-line (wavelength 546.1 nm) and the broken line shows values on the g-line, respectively.

From the aberration charts, it is clear that, in numeric example 1, various aberrations are successfully corrected and advantageous imaging characteristics are provided.

Second Embodiment

Figure 6:
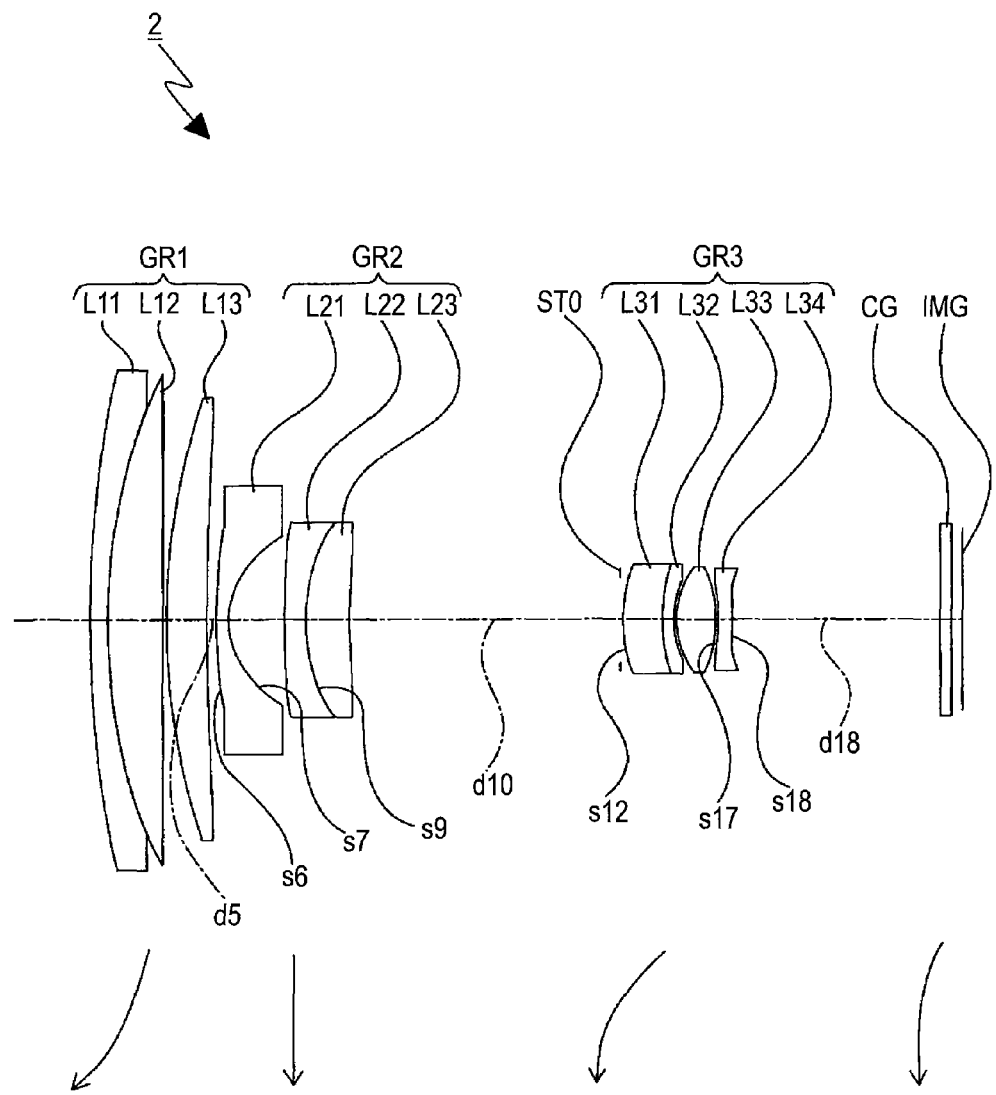
FIG. 6 shows a configuration of an imaging unit of a second embodiment of the present disclosure.

FIG. 6 shows a lens configuration of an imaging unit 2 in the second embodiment of the present disclosure.

The imaging unit 2 includes a first lens group GR1 having positive refractive power, a second lens group GR2 having negative refractive power, a third lens group GR3 having positive refractive power, and a solid-state imaging device IMG that images an optical image by the first lens group GR1 to the third lens group GR3 sequentially arranged from an object side toward an image side.

Figure 7:
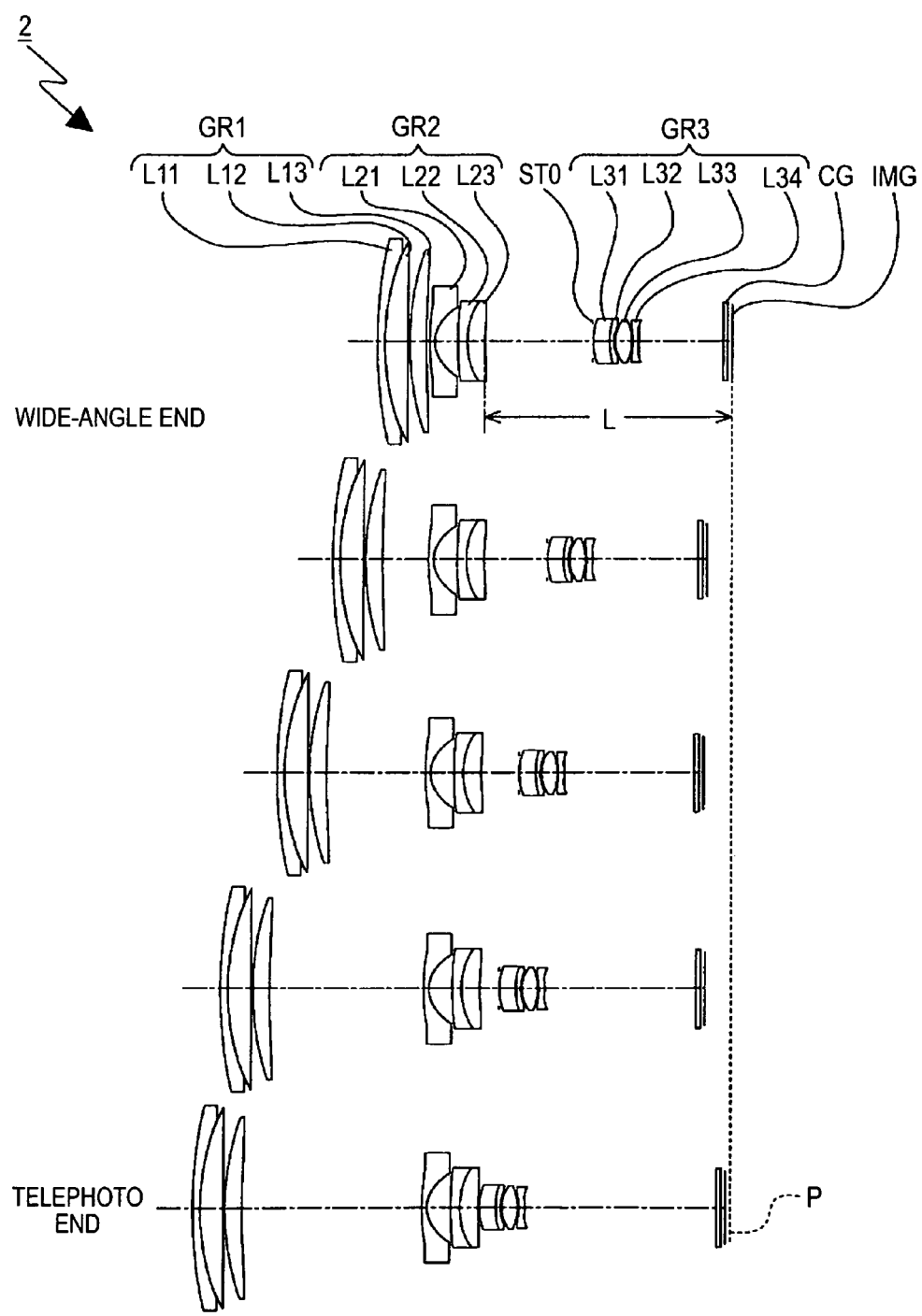
FIG. 7 shows movements of lens groups and a solid-state imaging device at zooming between a wide-angle end and a telephoto end with respect to the imaging unit of the second embodiment of the present disclosure.

In the imaging unit 2, as shown in FIG. 7, at zooming from a wide-angle end to a telephoto end, the first lens group GR1 moves toward the object side to increase a distance to the second lens group GR2 and the third lens group GR3 moves toward the object side to decrease a distance to the second lens group GR2. The second lens group GR2 is fixed in an optical axis direction at zooming from the wide-angle end to the telephoto end.

At zooming from the wide-angle end to the telephoto end, the solid-state imaging device IMG is moved in the optical axis direction and the solid-state imaging device IMG is located in a position P closest to the image side at the wide-angle end.

Further, in the imaging unit 2, a distance L from the second lens group GR2 to the solid-state imaging device IMG at the wide-angle end is set to the longest in all zoom positions.

Furthermore, in the imaging unit 2, the solid-state imaging device IMG is moved in the optical axis direction and focusing is performed, and, at focusing from infinity object focusing to close-range object focusing, the solid-state imaging device IMG moves from the object side toward the image side.

In the imaging unit 2, a scaling ratio is 9.41×.

The first lens group GR1 includes a cemented lens formed by cementing a negative lens L11 having a meniscus shape with its convex surface directed toward the object side and a first positive lens L12 having a meniscus shape with its convex surface directed toward the object side, and a second positive lens L13 having a meniscus shape with its convex surface directed toward the object side sequentially arranged from the object side toward the image side.

The second lens group GR2 includes a first negative lens L21 having a meniscus shape with its concave surface directed toward the image side, and a cemented lens formed by cementing a second negative lens L22 having a meniscus shape with its concave surface directed toward the object side and a positive lens L23 having a meniscus shape with its convex surface directed toward the object side sequentially arranged from the object side toward the image side.

The third lens group GR3 includes a cemented lens formed by cementing a first positive lens L31 having a meniscus shape with its convex surface directed toward the object side and a first negative lens L32 having a meniscus shape with its concave surface directed toward the object side, a second positive lens L33 having a biconvex shape, and a second negative lens L34 with its concave surface directed toward the object side sequentially arranged from the object side toward the image side.

A cover glass CG is provided between the third lens group GR3 and an image surface IMG.

An aperture stop STO is provided between the second lens group GR2 and the third lens group GR3, provided near the first positive lens L31 of the third lens group GR3, and moves integrally with the third lens group GR3 in the optical axis direction.

Table 5 shows lens data of numeric value example 2 in which specific numeric values are applied to the imaging unit 2 in the second embodiment.

TABLE 5

| si | ri | di | ni | vi |
|---|---|---|---|---|
| 1 | 54.00 | 0.800 | 1.84666 | 23.780 |
| 2 | 26.84 | 2.579 | 1.61800 | 63.390 |
| 3 | 5552.32 | 0.150 | | |
| 4 | 33.52 | 1.810 | 1.80420 | 46.503 |
| 5 | 135.03 | (d5) | | |
| 6 (ASP) | 22.64 | 0.600 | 1.85135 | 40.100 |
| 7 (ASP) | 4.16 | 2.499 | | |
| 8 | 43.53 | 0.999 | 1.80420 | 46.503 |
| 9 (ASP) | 8.30 | 1.980 | 2.00170 | 19.324 |
| 10 | 23.41 | (d10) | | |
| STO | INFINITY | 0.100 | | |
| 12 (ASP) | 6.75 | 1.787 | 1.83441 | 37.285 |
| 13 | 8.56 | 0.600 | 1.94595 | 17.980 |
| 14 | 5.51 | 0.100 | | |
| 15 | 4.39 | 1.800 | 1.59201 | 67.023 |
| 16 | −5.73 | 0.100 | | |
| 17 (ASP) | −7.19 | 0.613 | 1.61881 | 63.855 |
| 18 (ASP) | −2521.99 | (d18) | | |
| 19 | INFINITY | 0.500 | 1.51680 | 64.200 |
| 20 | INFINITY | 0.500 | | |
| IMG | INFINITY | | | |

In the imaging unit 2, both surfaces (6th surface and 7th surface) of the first negative lens L21 of the second lens group GR2, the cemented surface (9th surface) of the cemented lens of the second lens group GR2, the object side surface (12th surface) of the first positive lens L31 of the third lens group GR3, and both surfaces (17th surface and 18th surface) of the second negative lens L34 of the third lens group GR3 are formed to be aspheric surfaces. Table 6 shows the aspherical coefficients A, B, C, D of the order of 4, 6, 8, 10 of the aspheric surfaces in numeric value example 2 with the conic constants K.

TABLE 6

| si | K | A | B | C | D |
|---|---|---|---|---|---|
| 6 | 4.16682E+00 | −4.54618E−04 | −1.34478E−06 | 7.51506E−08 | −6.79902E−10 |
| 7 | −6.63366E−01 | 8.81671E−04 | 1.55568E−05 | 1.94060E−06 | −8.76764E−08 |
| 9 | −8.70480E+00 | −4.67085E−04 | −9.47963E−06 | 3.63261E−07 | −9.30547E−09 |
| 12 | −9.32723E−01 | −2.34350E−04 | −3.60171E−05 | −4.07192E−06 | −5.97595E−08 |
| 17 | −1.01633E+01 | 3.69265E−03 | −4.49700E−04 | 7.44116E−05 | −8.61478E−06 |
| 18 | −2.08701E+29 | 9.30578E−03 | −4.45544E−04 | 9.04631E−05 | −4.44079E−06 |

Table 7 shows F-numbers FNO and half angles of view ω in the wide-angle end state (f=4.38), the intermediate focal length state (f=13.45), and the telephoto end state (f=41.21) of numeric value example 2.

TABLE 7

| | Wide-angle end | Intermediate focal length | Telephoto end |
|---|---|---|---|
| f | 4.38 | 13.45 | 41.21 |
| FNO | 3.30 | 4.55 | 6.27 |
| ω (°) | 41.47 | 16.08 | 5.37 |

In the imaging unit 2, at scaling between the wide-angle end state and the telephoto end state, the surface distance d5 between the first lens group GR1 and the second lens group GR2, the surface distance d10 between the second lens group GR2 and the third lens group GR3 (aperture stop STO), and the surface distance d18 between the third lens group GR3 and the cover glass CG change. Table 8 shows variable distances in the wide-angle end state (f=4.38), the intermediate focal length state (f=13.45), and the telephoto end state (f=41.21) in numeric value example 2.

TABLE 8

| | Wide-angle end | Intermediate focal length | Telephoto end |
|---|---|---|---|
| f | 4.38 | 13.45 | 41.21 |
| d5 | 0.500 | 11.011 | 20.165 |
| d10 | 12.381 | 4.445 | 0.150 |
| d18 | 9.602 | 14.670 | 21.691 |

Figure 8:
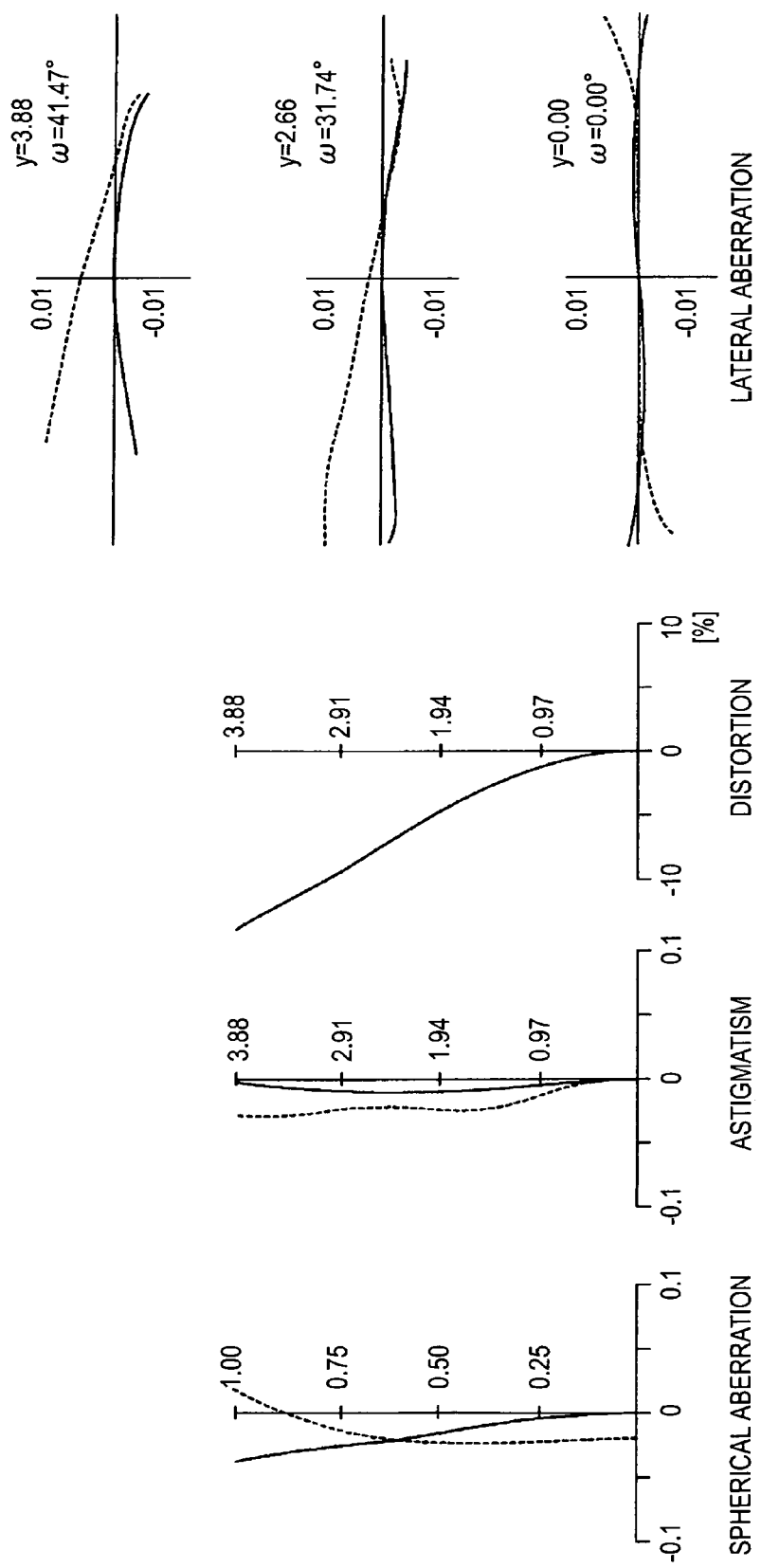
FIG. 8 shows aberration charts of numeric value examples in which specific numeric values are applied to the second embodiment together with FIGS. 9 and 10, and shows spherical aberration, astigmatism, distortion, and lateral aberration in a wide-angle end state.
Figure 9:
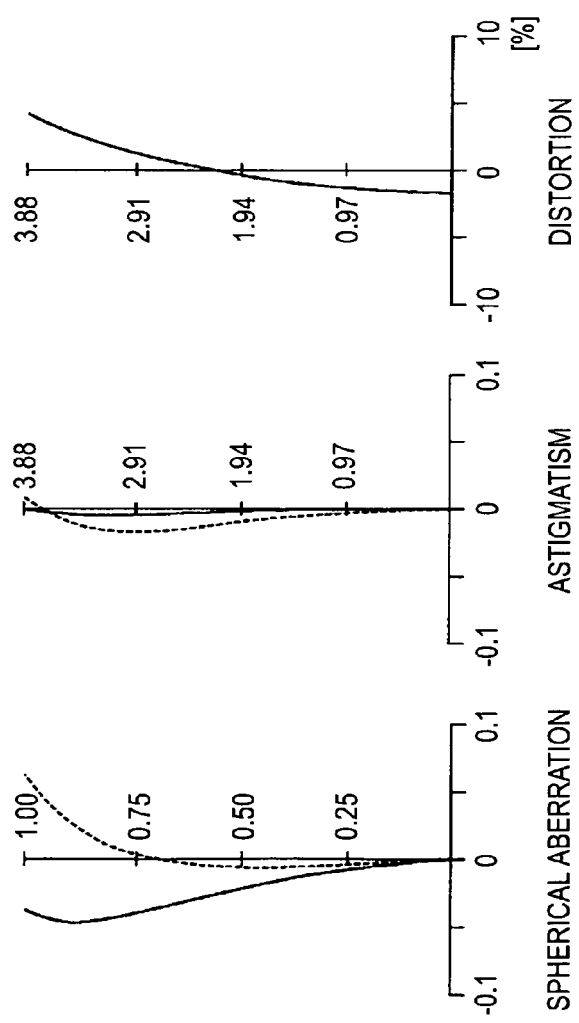
FIG. 9 shows spherical aberration, astigmatism, distortion, and lateral aberration in an intermediate focal length state.
Figure 10:
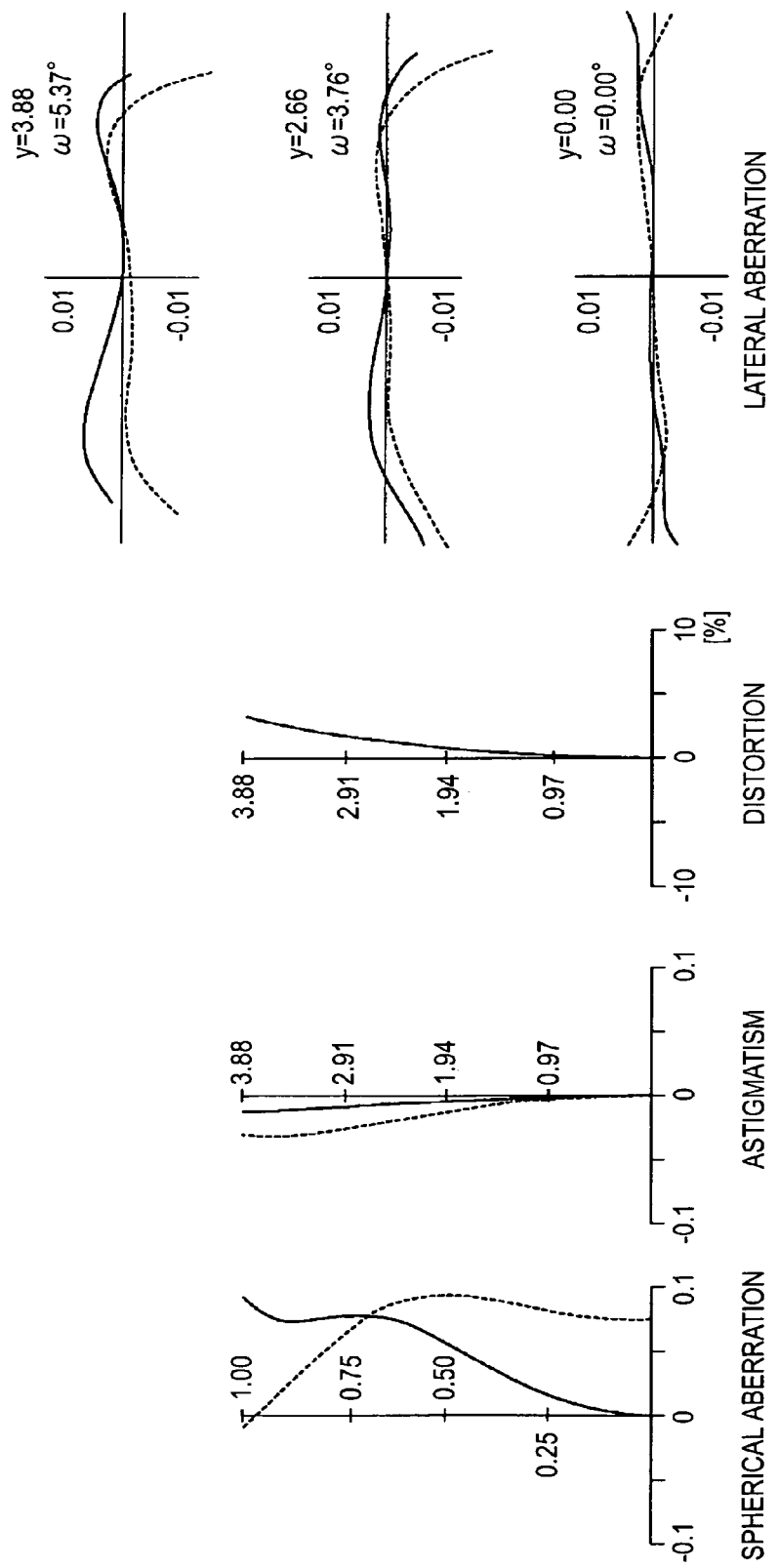
FIG. 10 shows spherical aberration, astigmatism, distortion, and lateral aberration in a telephoto end state.

FIGS. 8 to 10 show various aberration charts in an infinite focusing condition of numeric value example 2, and show various aberration charts in the wide-angle end state, the intermediate focal length state, and the telephoto end state, respectively.

In FIGS. 8 to 10, in spherical aberration charts, the solid line shows values on d-line (wavelength 587.6 nm) and the broken line shows values on g-line (wavelength 435.8 nm), respectively, in astigmatism charts, the solid line shows values on a sagittal image surface and the broken line shows values on a meridional image surface, respectively, and, in lateral aberration charts, the solid line shows values on e-line (wavelength 546.1 nm) and the broken line shows values on the g-line, respectively.

From the aberration charts, it is clear that, in numeric example 2, various aberrations are successfully corrected and advantageous imaging characteristics are provided.

Third Embodiment

Figure 11:
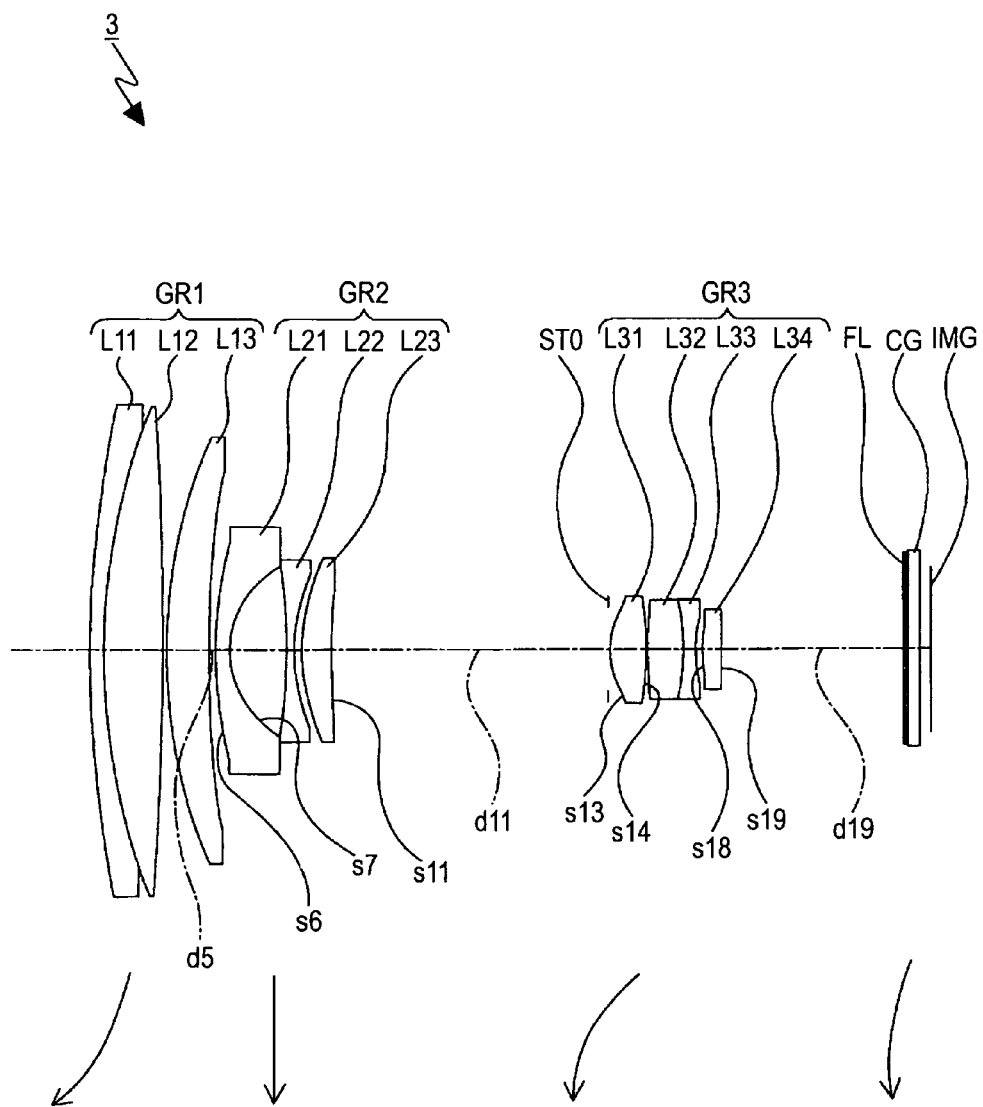
FIG. 11 shows a configuration of an imaging unit of a third embodiment of the present disclosure.

FIG. 11 shows a lens configuration of an imaging unit 3 in the third embodiment of the present disclosure.

The imaging unit 3 includes a first lens group GR1 having positive refractive power, a second lens group GR2 having negative refractive power, a third lens group GR3 having positive refractive power, and a solid-state imaging device IMG that images an optical image by the first lens group GR1 to the third lens group GR3 sequentially arranged from an object side toward an image side.

Figure 12:
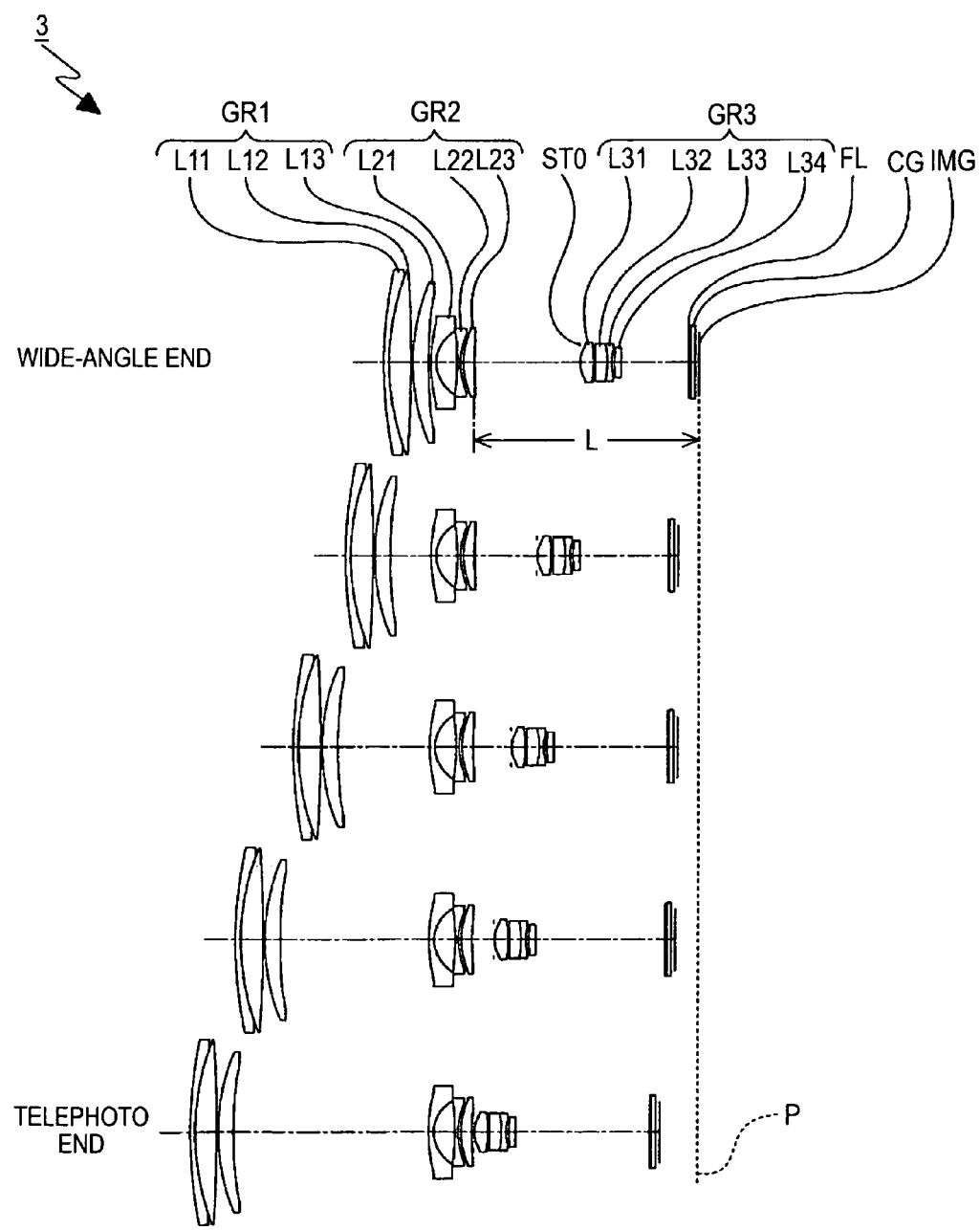
FIG. 12 shows movements of lens groups and a solid-state imaging device at zooming between a wide-angle end and a telephoto end with respect to the imaging unit of the third embodiment of the present disclosure.

In the imaging unit 3, as shown in FIG. 12, at zooming from a wide-angle end to a telephoto end, the first lens group GR1 moves toward the object side to increase a distance to the second lens group GR2 and the third lens group GR3 moves toward the object side to decrease a distance to the second lens group GR2. The second lens group GR2 is fixed in an optical axis direction at zooming from the wide-angle end to the telephoto end.

At zooming from the wide-angle end to the telephoto end, the solid-state imaging device IMG is moved in the optical axis direction and the solid-state imaging device IMG is located in a position P closest to the image side at the wide-angle end.

Further, in the imaging unit 3, a distance L from the second lens group GR2 to the solid-state imaging device IMG at the wide-angle end is set to the longest in all zoom positions.

Furthermore, in the imaging unit 3, the solid-state imaging device IMG is moved in the optical axis direction and focusing is performed, and, at focusing from infinity object focusing to close-range object focusing, the solid-state imaging device IMG moves from the object side toward the image side.

In the imaging unit 3, a scaling ratio is 11.76×.

The first lens group GR1 includes a cemented lens formed by cementing a negative lens L11 having a meniscus shape with its convex surface directed toward the object side and a first positive lens L12 having a biconvex shape, and a second positive lens L13 having a meniscus shape with its convex surface directed toward the object side sequentially arranged from the object side toward the image side.

The second lens group GR2 includes a first negative lens L21 having a meniscus shape with its concave surface directed toward the image side, a second negative lens L22 having a biconcave shape, a positive lens L23 having a meniscus shape with its convex surface directed toward the object side sequentially arranged from the object side toward the image side.

The third lens group GR3 includes a first positive lens L31 having a biconvex shape, a cemented lens formed by cementing a second positive lens L32 having a biconvex shape and a negative lens L33 having a biconcave shape, and a third positive lens L34 having a meniscus shape with its convex surface directed toward the object side sequentially arranged from the object side toward the image side.

A filter FL and a cover glass CG are provided between the third lens group GR3 and an image surface IMG and sequentially arranged from the object side toward the image side.

An aperture stop STO is provided between the second lens group GR2 and the third lens group GR3, provided near the first positive lens L31 of the third lens group GR3, and moves integrally with the third lens group GR3 in the optical axis direction.

Table 9 shows lens data of numeric value example 3 in which specific numeric values are applied to the imaging unit 3 in the third embodiment.

TABLE 9

| si | ri | di | ni | vi |
|---|---|---|---|---|
| 1 | 61.91 | 0.600 | 1.84666 | 23.780 |
| 2 | 30.76 | 2.692 | 1.59282 | 68.624 |
| 3 | −168.93 | 0.150 | | |
| 4 | 26.00 | 1.889 | 1.77250 | 49.624 |
| 5 | 58.03 | (d5) | | |
| 6 (ASP) | 18.00 | 0.500 | 1.88020 | 37.220 |
| 7 (ASP) | 4.59 | 2.599 | | |
| 8 | −24.61 | 0.400 | 1.77250 | 49.624 |
| 9 | 10.24 | 0.350 | | |
| 10 | 10.00 | 1.297 | 2.00170 | 19.324 |
| 11 (ASP) | 43.38 | (d11) | | |
| STO | INFINITY | 0.100 | | |
| 13 (ASP) | 4.20 | 1.600 | 1.58913 | 61.251 |
| 14 (ASP) | −80.00 | 0.206 | | |
| 15 | 47.81 | 1.500 | 1.49700 | 81.608 |
| 16 | −12.34 | 0.600 | 1.74077 | 27.761 |
| 17 | 8.60 | 0.300 | | |
| 18 (ASP) | 9.31 | 0.817 | 1.61881 | 63.855 |
| 19 (ASP) | 55.19 | (d19) | | |
| 20 | INFINITY | 0.100 | 1.51680 | 64.200 |
| 21 | INFINITY | 0.100 | | |
| 22 | INFINITY | 0.500 | 1.51680 | 64.200 |
| 23 | INFINITY | 0.500 | | |
| IMG | INFINITY | | | |

In the imaging unit 3, both surfaces (6th surface and 7th surface) of the first negative lens L21 of the second lens group GR2, the image side surface (11th surface) of the positive lens L23 of the second lens group GR2, both surfaces (13th surface and 14th surface) of the first positive lens L31 of the third lens group GR3, and both surfaces (18th surface and 19th surface) of the third positive lens L34 of the third lens group GR3 are formed to be aspheric surfaces. Table 10 shows the aspherical coefficients A, B, C, D of the order of 4, 6, 8, 10 of the aspheric surfaces in numeric value example 3 with the conic constants K.

TABLE 10

| si | K | A | B | C | D |
|---|---|---|---|---|---|
| 6 | 4.08242E+00 | −2.71576E−04 | −3.42741E−06 | −1.57971E−07 | 3.09566E−09 |
| 7 | −3.38986E−01 | 3.88422E−04 | 4.62718E−05 | 5.80287E−07 | −9.30210E−08 |
| 11 | −2.38670E+02 | 7.38773E−05 | −1.98687E−05 | 1.06844E−06 | −2.42865E−08 |
| 13 | 0.00000E+00 | −9.21344E−04 | −2.68616E−04 | 5.28875E−05 | −1.22228E−05 |
| 14 | 0.00000E+00 | −1.68597E−03 | −1.39654E−04 | −2.85308E−05 | −3.38493E−06 |
| 18 | −2.08653E+01 | −3.12947E−03 | −3.31468E−04 | −3.96799E−04 | 3.76249E−05 |
| 19 | −2.02391E+03 | −1.19303E−06 | −3.70664E−04 | −1.45787E−04 | 1.12636E−05 |

Table 11 shows F-numbers FNO and half angles of view ω in a wide-angle end state (f=4.38), an intermediate focal length state (f=14.79), and a telephoto end state (f=51.50) of numeric value example 3.

TABLE 11

|  | Wide-angle end | Intermediate focal length | Telephoto end |
|---|---|---|---|
| f | 4.38 | 14.79 | 51.50 |
| FNO | 3.37 | 5.05 | 5.84 |
| ω (°) | 41.48 | 14.68 | 4.30 |

In the imaging unit 3, at scaling between the wide-angle end state and the telephoto end state, the surface distance d5 between the first lens group GR1 and the second lens group GR2, the surface distance d11 between the second lens group GR2 and the third lens group GR3 (aperture stop STO), and the surface distance d19 between the third lens group GR3 and the cover glass CG change. Table 12 shows variable distances in the wide-angle end state (f=4.38), the intermediate focal length state (f=14.79), and the telephoto end state (f=51.50) in numeric value example 3.

TABLE 12

|  | Wide-angle end | Intermediate focal length | Telephoto end |
|---|---|---|---|
| F | 4.38 | 14.79 | 51.50 |
| d5 | 0.350 | 11.326 | 23.711 |
| d11 | 12.533 | 4.522 | 0.200 |
| d19 | 8.227 | 13.816 | 16.232 |

Figure 13:
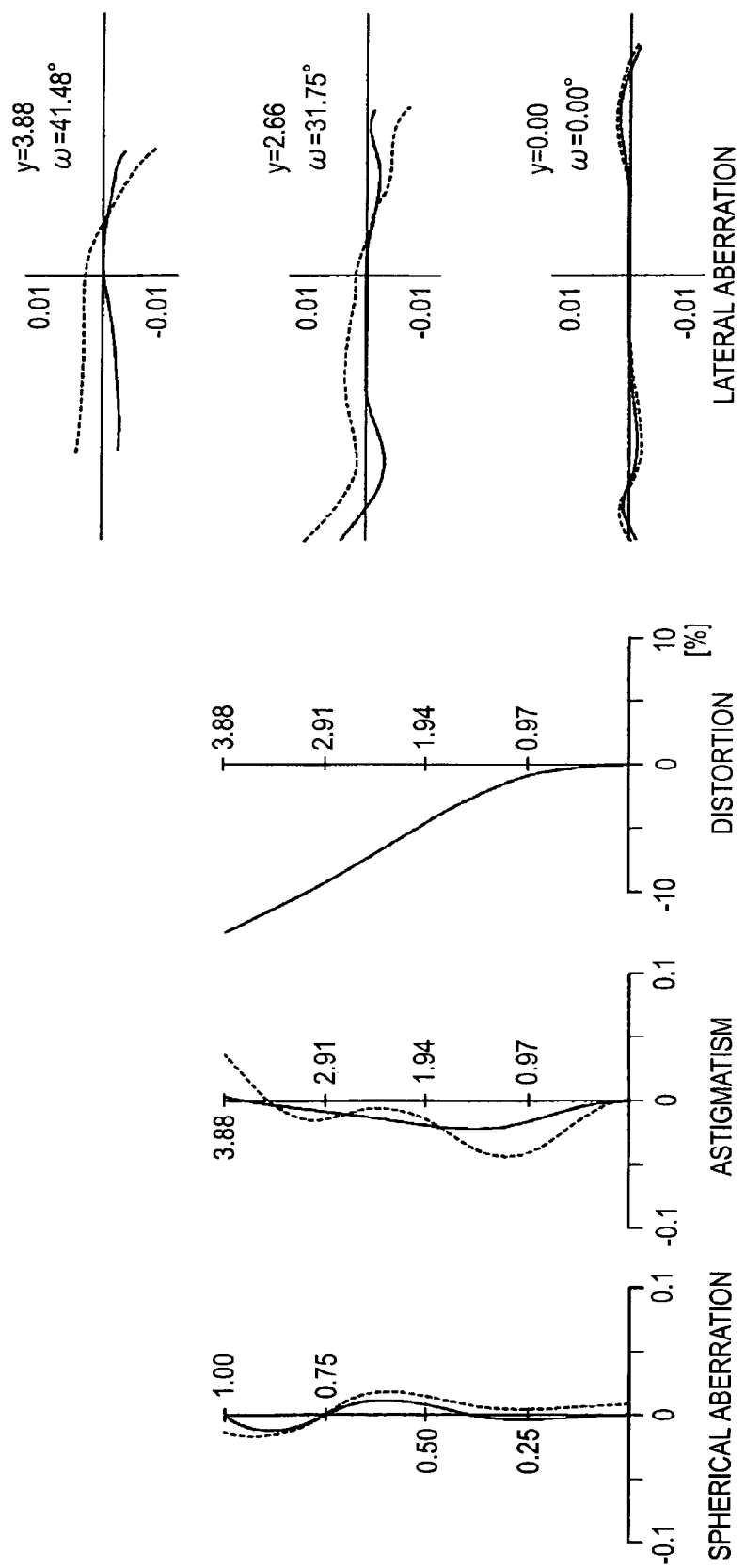
FIG. 13 shows aberration charts of numeric value examples in which specific numeric values are applied to the third embodiment together with FIGS. 14 and 15, and shows spherical aberration, astigmatism, distortion, and lateral aberration in a wide-angle end state.
Figure 14:
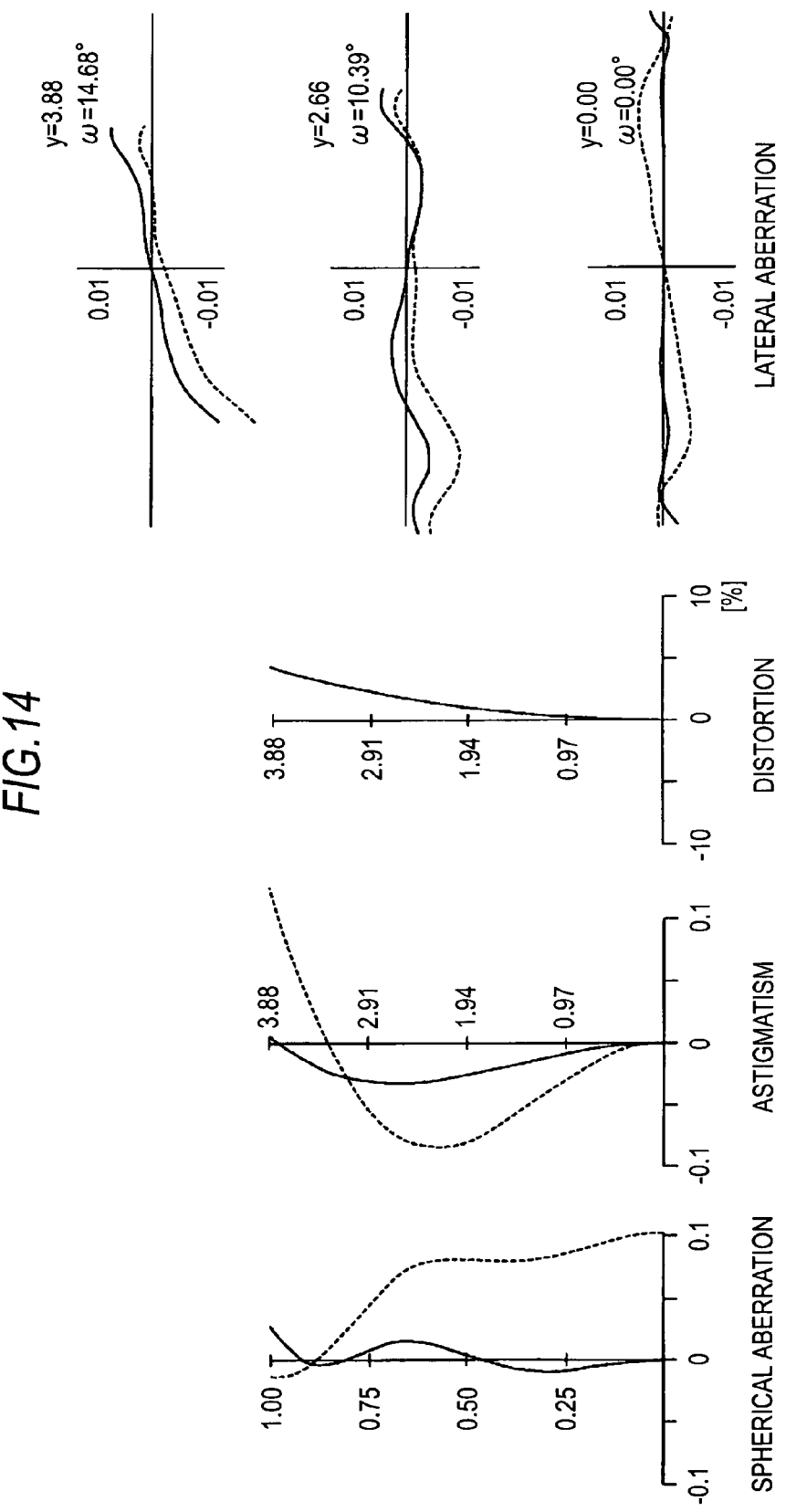
FIG. 14 shows spherical aberration, astigmatism, distortion, and lateral aberration in an intermediate focal length state.
Figure 15:
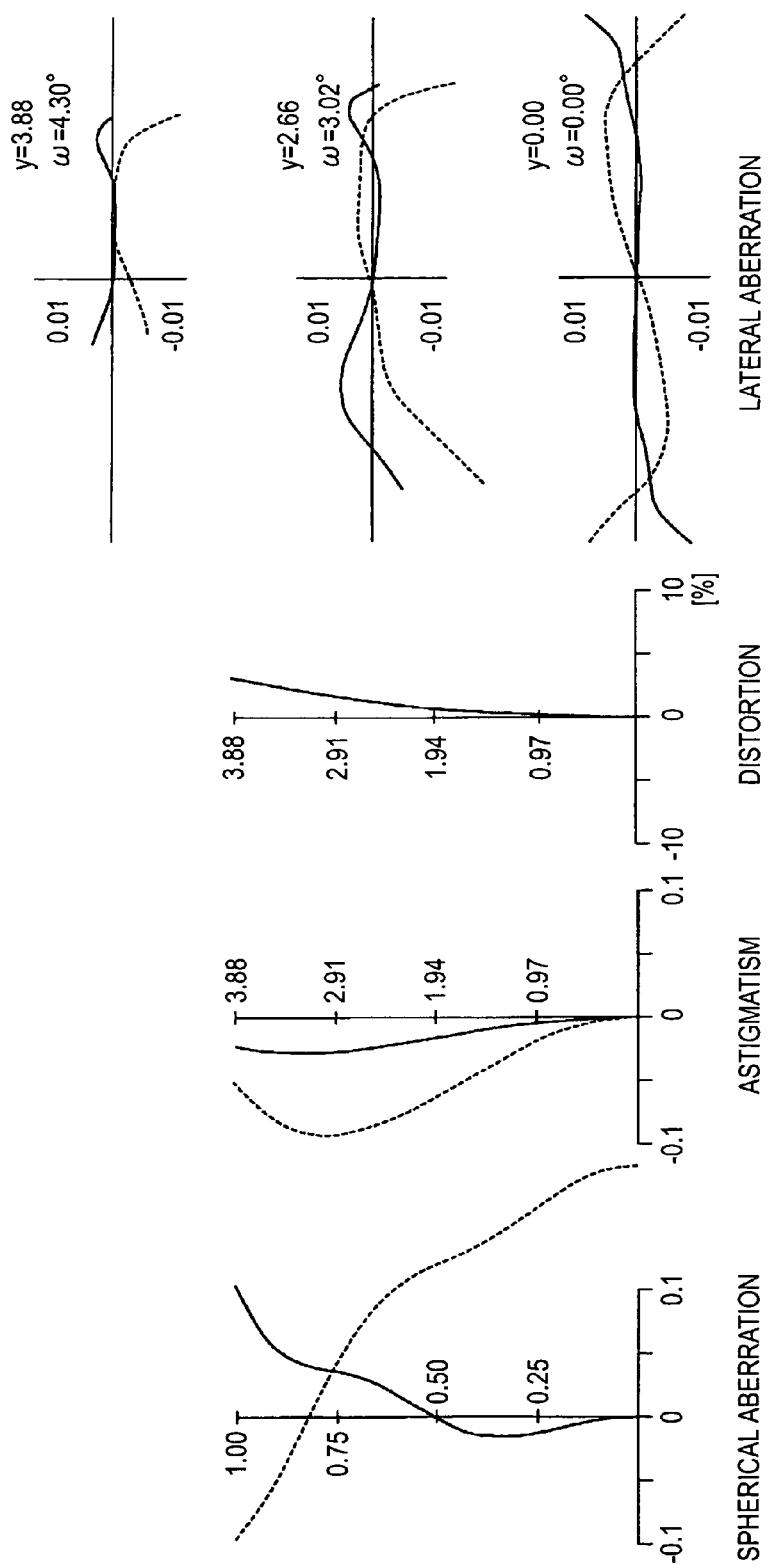
FIG. 15 shows spherical aberration, astigmatism, distortion, and lateral aberration in a telephoto end state.

FIGS. 13 to 15 show various aberration charts in an infinite focusing condition of numeric value example 3, and show various aberration charts in the wide-angle end state, the intermediate focal length state, and the telephoto end state, respectively.

In FIGS. 13 to 15, in spherical aberration charts, the solid line shows values on d-line (wavelength 587.6 nm) and the broken line shows values on g-line (wavelength 435.8 nm), respectively, in astigmatism charts, the solid line shows values on a sagittal image surface and the broken line shows values on a meridional image surface, respectively, and, in lateral aberration charts, the solid line shows values on e-line (wavelength 546.1 nm) and the broken line shows values on the g-line, respectively.

From the aberration charts, it is clear that, in numeric example 3, various aberrations are successfully corrected and advantageous imaging characteristics are provided.

Fourth Embodiment

Figure 16:
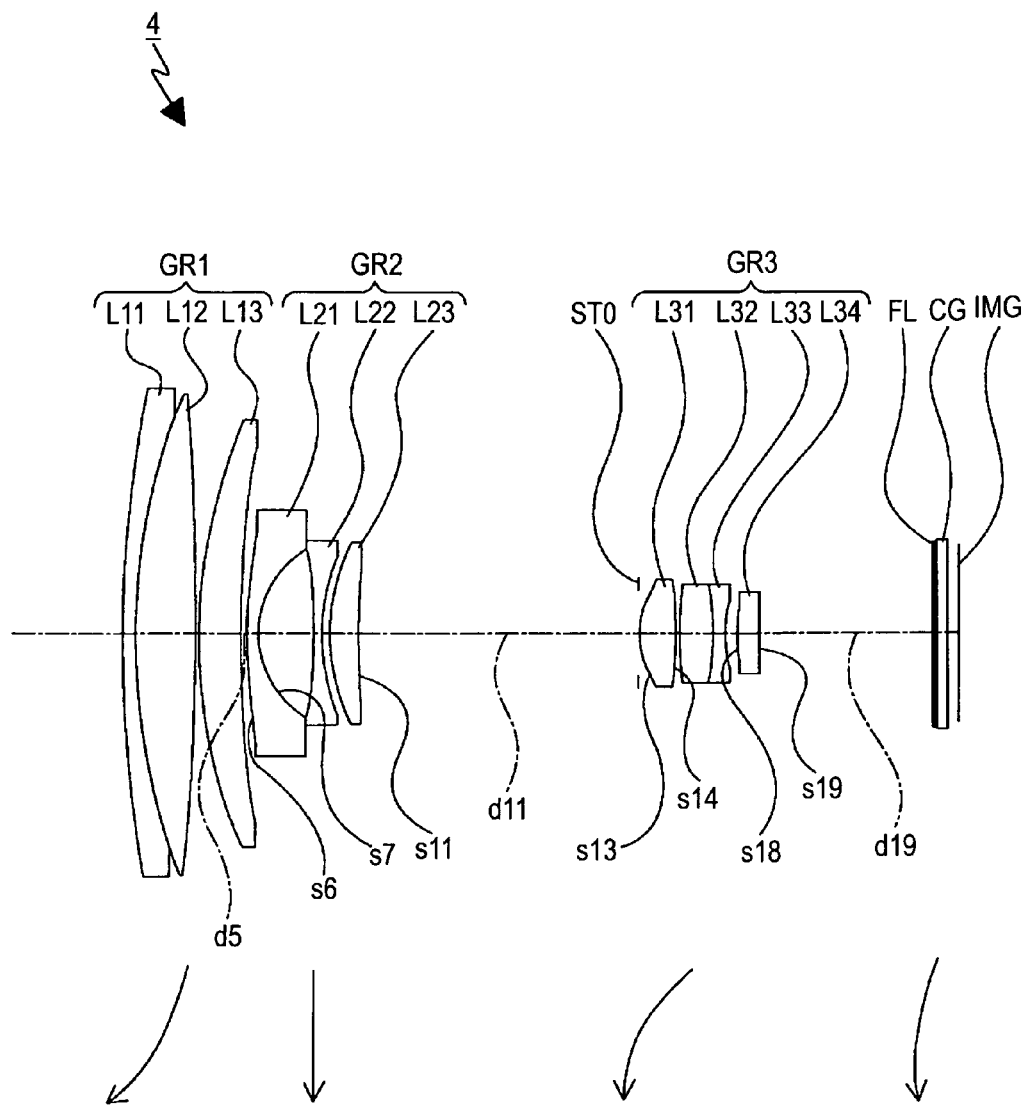
FIG. 16 shows a configuration of an imaging unit of a fourth embodiment of the present disclosure.

FIG. 16 shows a lens configuration of an imaging unit 4 in the fourth embodiment of the present disclosure.

The imaging unit 4 includes a first lens group GR1 having positive refractive power, a second lens group GR2 having negative refractive power, a third lens group GR3 having positive refractive power, and a solid-state imaging device IMG that images an optical image by the first lens group GR1 to the third lens group GR3 sequentially arranged from an object side toward an image side.

Figure 17:
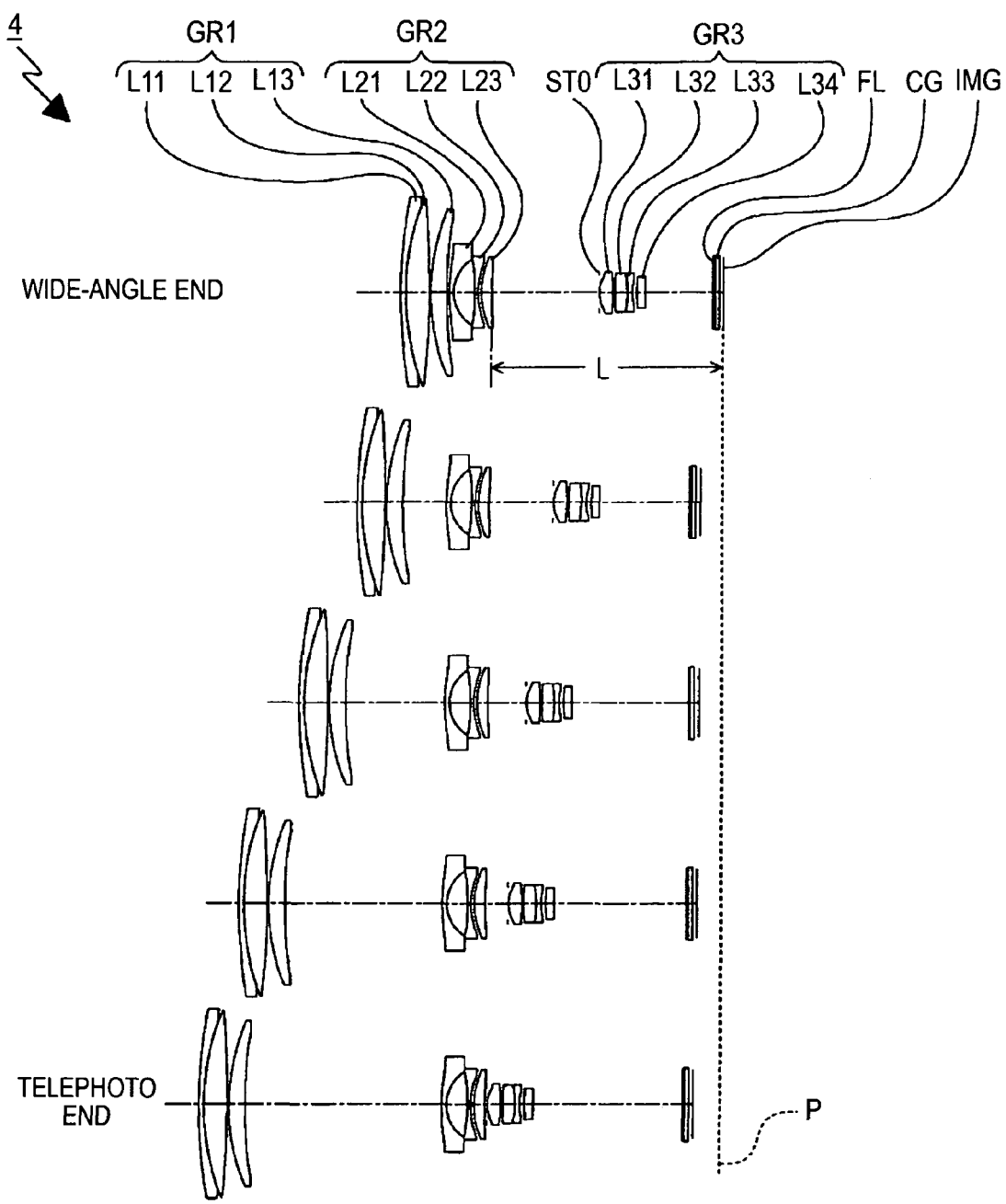
FIG. 17 shows movements of lens groups and a solid-state imaging device at zooming between a wide-angle end and a telephoto end with respect to the imaging unit of the fourth embodiment of the present disclosure.

In the imaging unit 4, as shown in FIG. 17, at zooming from a wide-angle end to a telephoto end, the first lens group GR1 moves toward the object side to increase a distance to the second lens group GR2 and the third lens group GR3 moves toward the object side to decrease a distance to the second lens group GR2. The second lens group GR2 is fixed in an optical axis direction at zooming from the wide-angle end to the telephoto end.

At zooming from the wide-angle end to the telephoto end, the solid-state imaging device IMG is moved in the optical axis direction and the solid-state imaging device IMG is located in a position P closest to the image side at the wide-angle end.

Further, in the imaging unit 4, a distance L from the second lens group GR2 to the solid-state imaging device IMG at the wide-angle end is set to the longest in all zoom positions.

Furthermore, in the imaging unit 4, the solid-state imaging device IMG is moved in the optical axis direction and focusing is performed, and, at focusing from infinity object focusing to close-range object focusing, the solid-state imaging device IMG moves from the object side toward the image side.

In the imaging unit 4, a scaling ratio is 11.78×.

The first lens group GR1 includes a cemented lens formed by cementing a negative lens L11 having a meniscus shape with its convex surface directed toward the object side and a first positive lens L12 having a biconvex shape, and a second positive lens L13 having a meniscus shape with its convex surface directed toward the object side sequentially arranged from the object side toward the image side.

The second lens group GR2 includes a first negative lens L21 having a meniscus shape with its concave surface directed toward the image side, a second negative lens L22 having a biconcave shape, and a positive lens L23 having a meniscus shape with its convex surface directed toward the object side sequentially arranged from the object side toward the image side.

The third lens group GR3 includes a first positive lens L31 having a biconvex shape, a cemented lens formed by cementing a second positive lens L32 having a biconvex shape and a negative lens L33 having a biconcave shape, and a third positive lens L34 having a meniscus shape with its convex surface directed toward the object side sequentially arranged from the object side toward the image side.

A filter FL and a cover glass CG are provided between the third lens group GR3 and an image surface IMG and sequentially arranged from the object side toward the image side.

An aperture stop STO is provided between the second lens group GR2 and the third lens group GR3, provided near the first positive lens L31 of the third lens group GR3, and moves integrally with the third lens group GR3 in the optical axis direction.

Table 13 shows lens data of numeric value example 4 in which specific numeric values are applied to the imaging unit 4 in the fourth embodiment.

TABLE 13

| si | ri | di | ni | vi |
|---|---|---|---|---|
| 1 | 64.36 | 0.600 | 1.84666 | 23.780 |
| 2 | 31.79 | 2.700 | 1.59282 | 68.624 |
| 3 | −121.74 | 0.150 |  |  |
| 4 | 26.00 | 1.818 | 1.77250 | 49.624 |
| 5 | 53.40 | (d5) |  |  |
| 6 (ASP) | 20.80 | 0.500 | 1.88020 | 37.220 |
| 7 (ASP) | 4.64 | 2.504 |  |  |
| 8 | −25.44 | 0.400 | 1.77250 | 49.624 |
| 9 | 10.39 | 0.350 |  |  |
| 10 | 10.00 | 1.309 | 2.00170 | 19.324 |
| 11 (ASP) | 46.74 | (d11) |  |  |
| STO | INFINITY | 0.100 |  |  |
| 13 (ASP) | 4.20 | 1.600 | 1.59201 | 67.023 |
| 14 (ASP) | −80.00 | 0.170 |  |  |

TABLE 13-continued

| si | ri | di | ni | vi |
|---|---|---|---|---|
| 15 | 26.56 | 1.500 | 1.49700 | 81.608 |
| 16 | −17.13 | 0.600 | 1.74077 | 27.761 |
| 17 | 8.00 | 0.550 | | |
| 18 (ASP) | 10.92 | 1.000 | 1.61881 | 63.855 |
| 19 (ASP) | 47.98 | (d19) | | |
| 20 | INFINITY | 0.100 | 1.51680 | 64.200 |
| 21 | INFINITY | 0.100 | | |
| 22 | INFINITY | 0.500 | 1.51680 | 64.200 |
| 23 | INFINITY | 0.500 | | |
| IMG | INFINITY | | | |

In the imaging unit 4, both surfaces (6th surface and 7th surface) of the first negative lens L21 of the second lens group GR2, the image side surface (11th surface) of the positive lens L23 of the second lens group GR2, both surfaces (13th surface and 14th surface) of the first positive lens L31 of the third lens group GR3, and both surfaces (18th surface and 19th surface) of the third positive lens L34 of the third lens group GR3 are formed to be aspheric surfaces. Table 14 shows the aspherical coefficients A, B, C, D of the order of 4, 6, 8, 10 of the aspheric surfaces in numeric value example 4 with the conic constants K.

TABLE 14

| Si | K | A | B | C | D |
|---|---|---|---|---|---|
| 6 | 5.12297E+00 | −2.99852E−04 | −3.03004E−06 | −1.33839E−07 | 2.94527E−09 |
| 7 | −2.88886E−01 | 3.29541E−04 | 3.12425E−05 | 7.91858E−07 | −1.15121E−07 |
| 11 | −3.48913E+02 | 1.25838E−04 | −2.39325E−05 | 1.19945E−06 | −2.49597E−08 |
| 13 | 0.00000E+00 | −7.56535E−04 | −1.80929E−04 | 3.75061E−05 | −8.57982E−06 |
| 14 | 0.00000E+00 | −7.87415E−04 | −1.12357E−04 | −1.29888E−05 | −3.90324E−06 |
| 18 | −2.67189E+01 | −3.28640E−03 | −1.86897E−04 | −4.07166E−04 | 4.61776E−05 |
| 19 | −2.00998E+03 | 4.32962E−04 | −5.51622E−04 | −8.81255E−05 | 1.13613E−05 |

Table 15 shows F-numbers FNO and half angles of view ω in a wide-angle end state (f=4.38), an intermediate focal length state (f=15.03), and a telephoto end state (f=51.60) of numeric value example 4.

TABLE 15

| | Wide-angle end | Intermediate focal length | Telephoto end |
|---|---|---|---|
| f | 4.38 | 15.03 | 51.60 |
| FNO | 3.39 | 5.04 | 6.35 |
| ω (°) | 41.48 | 14.46 | 4.30 |

In the imaging unit 4, at scaling between the wide-angle end state and the telephoto end state, the surface distance d5 between the first lens group GR1 and the second lens group GR2, the surface distance d11 between the second lens group GR2 and the third lens group GR3 (aperture stop STO), and the surface distance d19 between the third lens group GR3 and the cover glass CG change. Table 16 shows variable distances in the wide-angle end state (f=4.38), the intermediate focal length state (f=15.03), and the telephoto end state (f=51.60) in numeric value example 4.

TABLE 16

| | Wide-angle end | Intermediate focal length | Telephoto end |
|---|---|---|---|
| f | 4.38 | 15.03 | 51.60 |
| d5 | 0.350 | 11.643 | 22.942 |

TABLE 16-continued

| | Wide-angle end | Intermediate focal length | Telephoto end |
|---|---|---|---|
| d11 | 12.586 | 4.544 | 0.200 |
| d19 | 7.836 | 13.443 | 17.453 |

Figure 18:
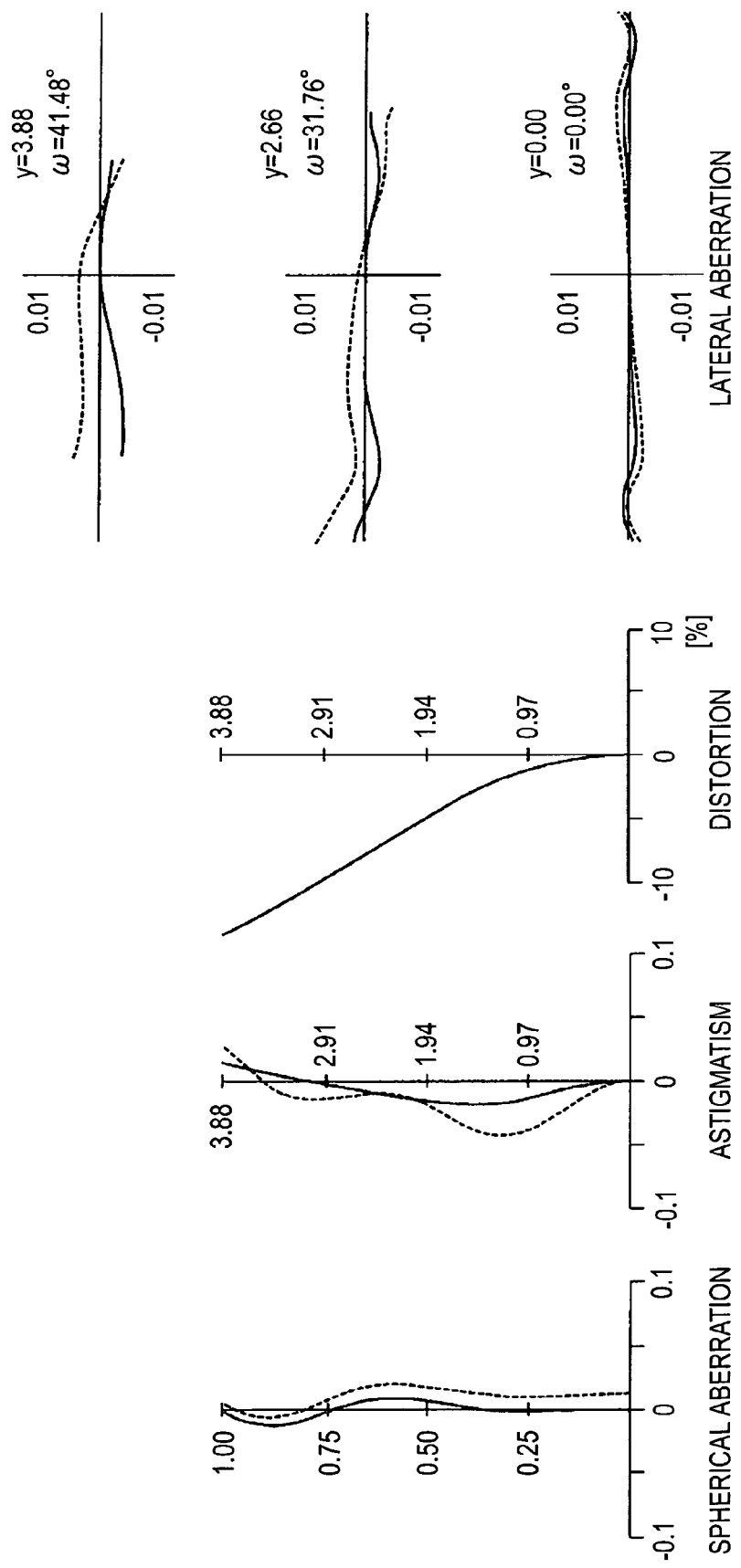
FIG. 18 shows aberration charts of numeric value examples in which specific numeric values are applied to the fourth embodiment together with FIGS. 19 and 20, and shows spherical aberration, astigmatism, distortion, and lateral aberration in a wide-angle end state.
Figure 19:
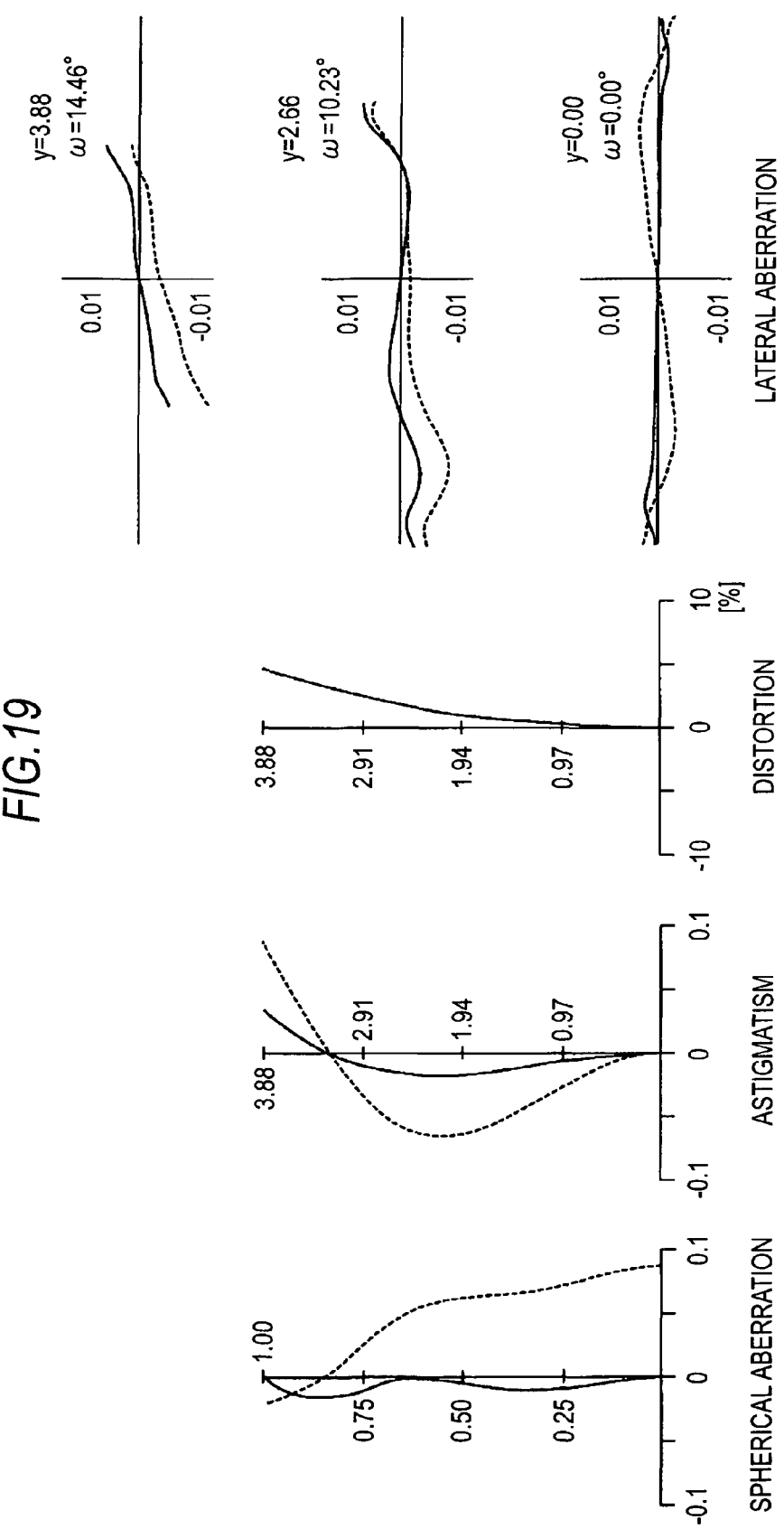
FIG. 19 shows spherical aberration, astigmatism, distortion, and lateral aberration in an intermediate focal length state.
Figure 20:
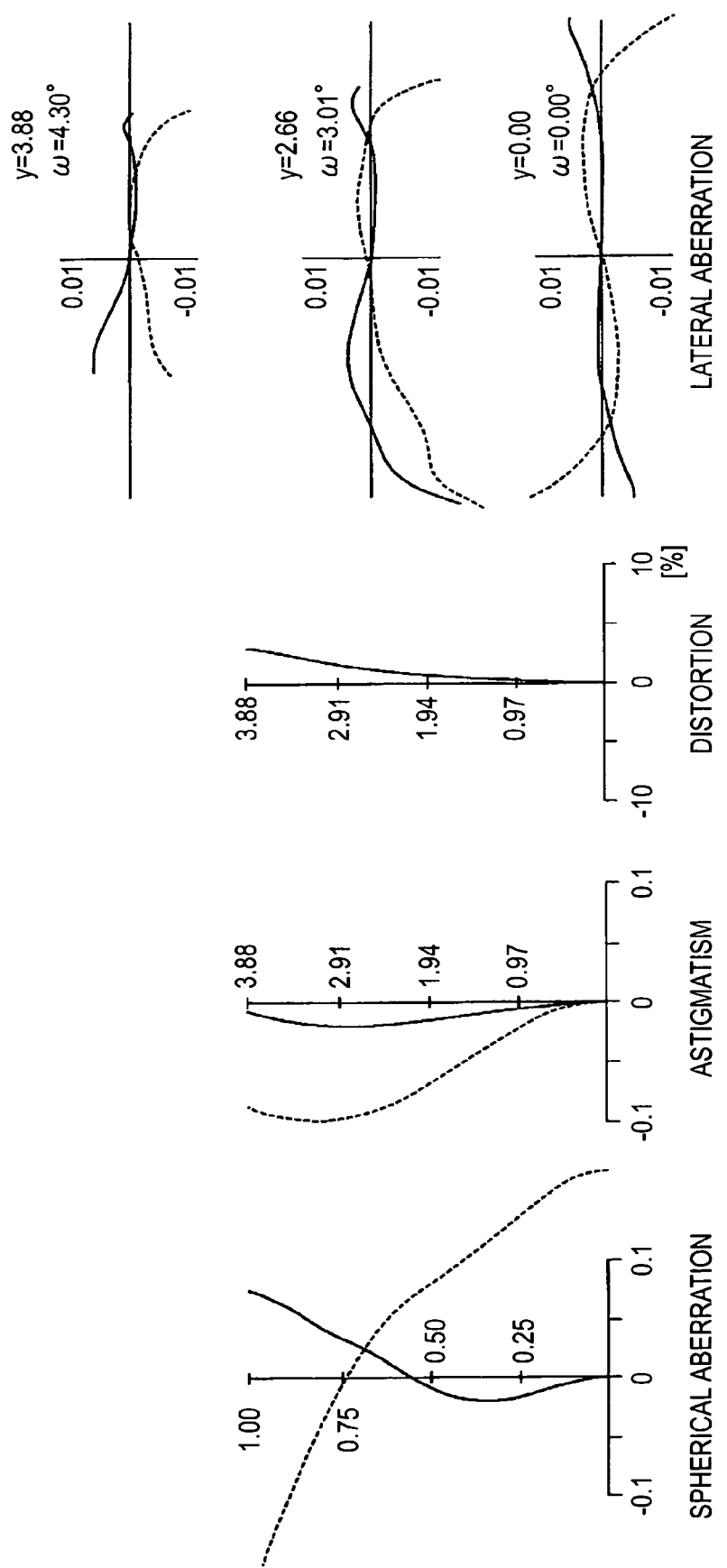
FIG. 20 shows spherical aberration, astigmatism, distortion, and lateral aberration in a telephoto end state.

FIGS. 18 to 20 show various aberration charts in an infinite focusing condition of numeric value example 4, and show various aberration charts in the wide-angle end state, the intermediate focal length state, and the telephoto end state, respectively.

In FIGS. 18 to 20, in spherical aberration charts, the solid line shows values on d-line (wavelength 587.6 nm) and the broken line shows values on g-line (wavelength 435.8 nm), respectively, in astigmatism charts, the solid line shows values on a sagittal image surface and the broken line shows values on a meridional image surface, respectively, and, in lateral aberration charts, the solid line shows values on e-line (wavelength 546.1 nm) and the broken line shows values on the g-line, respectively.

From the aberration charts, it is clear that, in numeric example 4, various aberrations are successfully corrected and advantageous imaging characteristics are provided.

Supplement of Embodiments

In all of the above described imaging unit 1 to imaging unit 4 in the first embodiment to the fourth embodiment, the configuration in which the first lens group GR1 and the third lens group GR3 move away from or close to the second lens group GR2 at zooming from the wide-angle end to the telephoto end has been shown as an example.

However, in the imaging unit 1 to the imaging unit 4, it is necessary that the respective lens groups may be movable so that the distance between the first lens group GR1 and the second lens group GR2 may be larger and the distance between the second lens group GR2 and the third lens group GR3 may be smaller at zooming from the wide-angle end to the telephoto end.

Further, the second lens group GR2 has been fixed in the optical axis direction at zooming between the wide-angle end and the telephoto end, however, the second lens group GR2 may be moved in the optical axis direction at zooming between the wide-angle end and the telephoto end.

[Respective Values of Condition Expressions of Imaging Units]

Table 17 shows the respective values of the condition expression (1) to the condition expression (4) in the imaging unit 1 to the imaging unit 4.

TABLE 17

|  |  | Imaging unit 1 | Imaging unit 2 | Imaging unit 3 | Imaging unit 4 |
|---|---|---|---|---|---|
|  | f3 | 8.200 | 8.432 | 8.200 | 8.200 |
|  | fw | 4.378 | 4.378 | 4.378 | 4.378 |
|  | ft | 41.225 | 41.225 | 51.604 | 41.225 |
| Condition Expression (1) | $0.45 < f3/(fw \cdot ft)^{1/2} < 0.70$ | 0.625 | 0.628 | 0.546 | 0.610 |
|  | f2 | −5.720 | −5.846 | −5.702 | −5.720 |
| Condition Expression (2) | $-0.50 < f2/(fw \cdot ft)^{1/2} < -0.3$ | −0.438 | −0.435 | −0.379 | −0.426 |
|  | f12w | −7.381 | −7.549 | −7.383 | −7.381 |
| Condition Expression (3) | $-2.0 < f12w/fw < -1.5$ | −1.762 | −1.725 | −1.687 | −1.686 |
|  | f23t | 131.290 | 40.842 | 111.910 | 131.290 |
| Condition Expression (4) | $0.8 < f23t/ft < 3.5$ | 0.917 | 0.991 | 2.169 | 3.185 |

As is clear from Table 17, the imaging unit 1 to the imaging unit 4 are adapted to satisfy the condition expression (1) to the condition expression (4).

[Configuration of Imaging Apparatus]

In an imaging apparatus according to one embodiment of the present disclosure, an imaging unit includes a first lens group having positive refractive power, a second lens group having negative refractive power, a third lens group having positive refractive power, and a solid-state imaging device that images an optical image formed by the first lens group to the third lens group sequentially arranged from an object side toward an image side.

Further, in the imaging apparatus according to one embodiment of the present disclosure, in the imaging unit, at zooming from a wide-angle end to a telephoto end, a distance between the first lens group and the second lens group becomes larger and a distance between the second lens group and the third lens group becomes smaller, and a distance from the second lens group to the solid-state imaging device on the wide-angle end is the longest in all zoom positions.

According to the above described configuration, while the wider angle is secured, higher magnification may be realized by maximizing the scaling effect of the second lens group and the third lens group that greatly contribute to the scaling effect at zooming, and further, downsizing may be realized by shortening the entire length of the whole optical system.

[One Embodiment of Imaging Apparatus]

Figure 21:
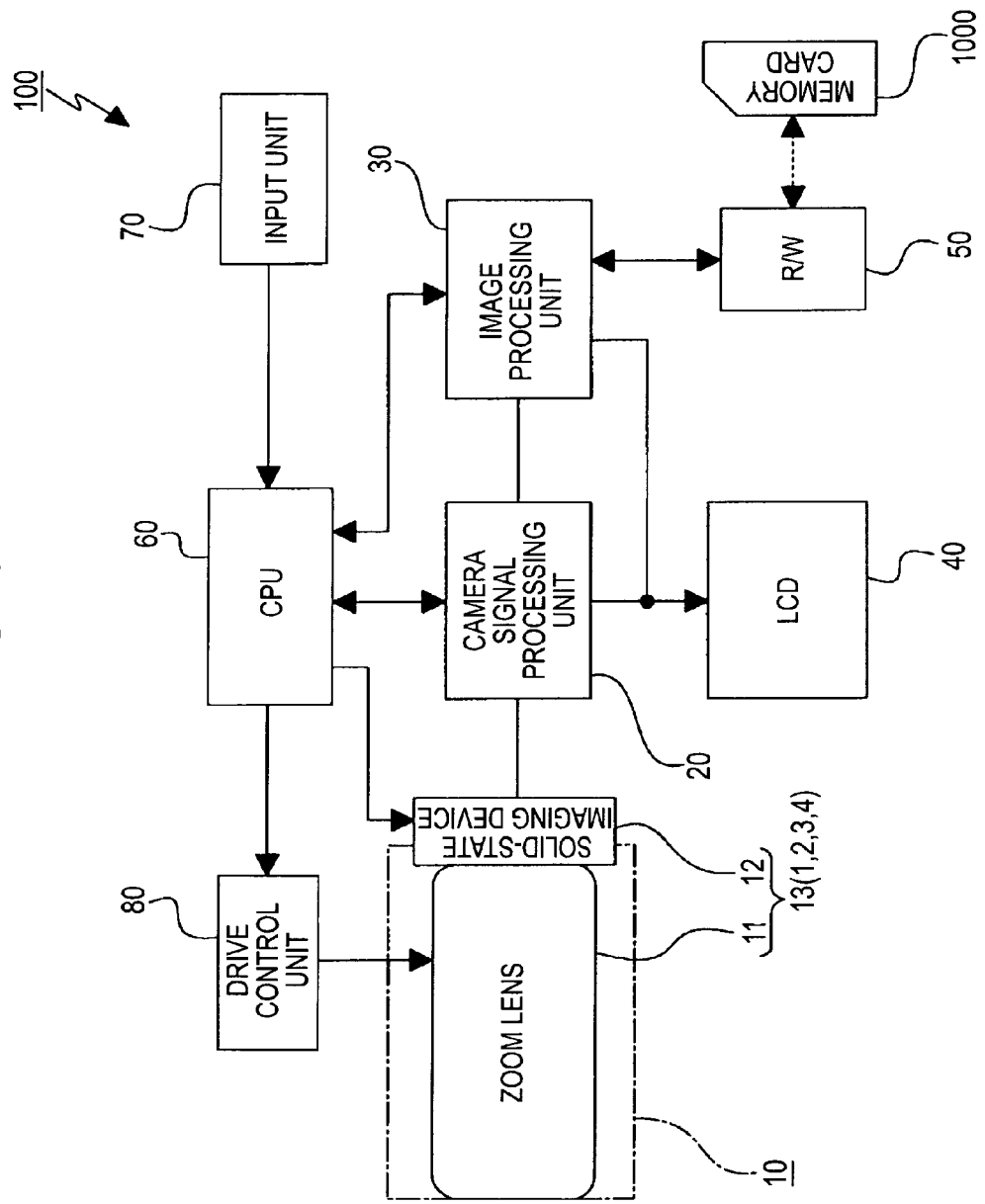
FIG. 21 is a block diagram showing an imaging apparatus of one embodiment of the present disclosure.

FIG. 21 shows a block diagram of a digital still camera according to one embodiment of the imaging apparatus of the present disclosure.

An imaging apparatus (digital camera) 100 has a camera block 10 that has an imaging function, a camera signal processing unit 20 that performs signal processing of analog-digital conversion of imaged image signals etc., an image processing unit 30 that performs recording and reproduction processing of the image signals. Further, the imaging apparatus 100 has an LCD (Liquid Crystal Display) 40 that displays imaged images etc., an R/W (reader/writer) 50 that performs writing and reading of the image signals in and from a memory card 1000, and a CPU (Central Processing Unit) 60 that controls the entire imaging apparatus 100. Furthermore, the imaging apparatus 100 has an input unit 70 including various switches with which necessary operations are performed by a user etc., and a drive control unit 80 that controls driving of the lenses provided in the camera block 10 and a solid-state imaging device, which will be described later.

The camera block 10 has an imaging unit 13 (the imaging unit 1, 2, 3, 4 to which the present disclosure is applied) including a zoom lens 11, a solid-state imaging device 12 such as a CCD (Charge Coupled Device) or a CMOS (Complementary Metal-Oxide Semiconductor), etc.

The camera signal processing unit 20 performs various kinds of signal processing such as conversion of output signals from the solid-state imaging device 12 into digital signals, noise removal, image quality correction, conversion into brightness, color-difference signals, etc.

The image processing unit 30 performs compression coding and stretching and decoding processing of the image signals based on a predetermined image data format, conversion processing of data specifications of resolution, etc.

The LCD 40 has a function of displaying various kinds of data of operation statuses for the input unit 70 by the user, imaged images, etc.

The R/W 50 performs writing of image data coded by the image processing unit 30 in the memory card 1000 and reading of image data recorded in the memory card 1000.

The CPU 60 functions as a control processing unit that controls the respective circuit blocks provided in the imaging apparatus 100, and controls the respective circuit blocks based on command input signals from the input unit 70 or the like.

The input unit 70 includes, for example, a shutter release button for shutter operation, a selection switch for selection of an operation mode, etc., and outputs the command input signals in response to the operation by the user to the CPU 60.

The drive control unit 80 controls motors (not shown) that drive the respective lenses of the zoom lens 11 etc. based on control signals from the CPU 60.

The memory card 1000 is a semiconductor memory detachable from a slot connected to the R/W 50, for example.

As below, operations in the imaging apparatus 100 will be explained.

In a wait status for imaging, under the control by the CPU 60, the image signals imaged in the camera block 10 are output to the LCD 40 via the camera signal processing unit 20 and displayed as camera through images. Further, when a command input signal for zooming from the input unit 70 is input, the CPU 60 outputs a control signal to the drive control unit 80 and a predetermined lens of the zoom lens 11 is moved according to the control of the drive control unit 80.

When a shutter (not shown) of the camera block 10 is activated by the command input signal from the input unit 70, the imaged image signals are output from the camera signal processing unit 20 to the image processing unit 30, subjected to compression coding processing, and converted into digital data in a predetermined data format. The converted data is output to the R/W 50, and written in the memory card 1000.

Note that focusing is performed when the drive control unit 80 moves a predetermined lens of the zoom lens 11 according to the control signal from the CPU 60 in the case where the shutter release button of the input unit 70 is pressed halfway or fully pressed for recording (imaging) or the like, for example.

When the image data recorded in the memory card 1000 is reproduced, in response to the operation for the input unit 70, predetermined image data is read out from the memory card 1000 by the R/W 50, stretching and decoding processing is performed thereon by the image processing unit 30, and then, the reproduced image signals are output to the LCD 40 and reproduced images are displayed.

Note that, in the above described embodiment, the example in which the imaging apparatus is applied to the digital still camera has been shown, however, the application range of the imaging apparatus is not limited to the digital still camera, but the apparatus may be widely applied to a camera unit or the like of digital input/output equipment of a digital video camera, a cellular phone with a camera incorporated therein, a PDA (Personal Digital Assistant) with a camera incorporated therein, etc.

Any shapes of the respective parts and numeric values shown in the above described respective embodiments are just examples for implementing the present disclosure, and the technical range of the present disclosure should not interpret to a limited extent.

The present disclosure contains subject matter related to that disclosed in Japanese Priority Patent Application JP 2010-181666 filed in the Japan Patent Office on Aug. 16, 2010, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging unit comprising:
a first lens group having positive refractive power;
a second lens group having negative refractive power;
a third lens group having positive refractive power; and
a solid-state imaging device that images an optical image formed by the first lens group to the third lens group sequentially arranged along an optical axis from an object side toward an image side,
wherein, the second lens group is disposed in a fixed, stationary position on the optical axis and between the first lens group and the third lens group and the third lens group is disposed between the second lens group and the solid-state imaging device,
wherein the first lens group, the third lens group and the solid-state imaging device are movable along the optical axis and relative to the second lens group in the fixed, stationary position to and between a wide-angle end state and a telephoto end state,
wherein, at the wide-angle end state, the solid-state imaging device is disposed apart from the second lens group at a first distance and while zooming from the wide-angle end state to the telephoto end state, the first lens group moves away from the second lens group, the third lens group moves towards the second lens group and the solid-state imaging device moves along the optical axis into a solid-state imaging device position disposed away from the second lens group at a second distance being less than the first distance,
wherein the first lens group includes a first lens group cemented lens formed by cementing a first lens group negative lens having a meniscus shape with a first lens group negative lens convex surface directed toward the object side and a first lens group first positive lens having a meniscus shape with a first lens group first positive lens convex surface directed toward the object side and a first lens group second positive lens having a meniscus shape with a first lens group second positive lens convex surface directed toward the object side and sequentially arranged from the object side toward the image side,
wherein the second lens group includes a second lens group first negative lens having a meniscus shape with a second lens group first negative lens concave surface directed toward the image side and a second lens group cemented lens formed by cementing a second lens group second negative lens having a meniscus shape with a second lens group second negative lens concave surface directed toward the object side and a second lens group positive lens having a meniscus shape with a second lens group positive lens convex surface directed toward the object side and sequentially arranged from the object side toward the image side and
wherein the third lens group includes a third lens group cemented lens formed by cementing a third lens group first positive lens having a meniscus shape with a third lens group first positive lens convex surface directed toward the object side and a third lens group first negative lens having a meniscus shape with a third lens group first negative lens concave surface directed toward the object side, a third lens group second positive lens having a biconvex shape and a third lens group second negative lens with a third lens group second negative lens concave surface directed toward the object side and sequentially arranged from the object side toward the image side.

2. The imaging unit according to claim 1, wherein an aperture stop is provided between the second lens group and the third lens group, and
the aperture stop moves integrally with the third lens group at zooming.

3. The imaging unit according to claim 1, wherein a lens surface located closest to the image side in the third lens group is formed to be an aspheric surface.

4. The imaging unit according to claim 1, wherein the second lens group is formed by sequentially arranging a first negative lens, a second negative lens, and a positive lens from the object side toward the image side.

5. The imaging unit according to claim 1, wherein the following condition expression (3) is satisfied $$-2.0 < f12w/fw < -1.5 \tag{3}$$

where
f12w: combined focal length of first lens group and second lens group at wide-angle end
fw: focal length of whole optical system at wide-angle end.

6. The imaging unit according to claim 1, wherein the solid-state imaging device is moved in an optical axis direction and focusing is performed.

7. The imaging unit according to claim 6, wherein, at focusing from infinity object focusing to close-range object focusing, the solid-state imaging device moves from the object side toward the image side.

8. The imaging unit according to claim 1, wherein the solid-state imaging device is moved in the optical axis direction at zooming, and a position of the solid-state imaging device at the wide-angle end is closest to the image side than at infinity object focusing.

9. The imaging unit according to claim 1, wherein the second lens group is fixed in the optical axis direction at zooming.

10. The imaging unit according to claim 1, wherein the solid-state imaging device is moved in an optical axis direction and focusing is performed,
the solid-state imaging device is moved in the optical axis direction at zooming, and
at focusing and zooming, the solid-state imaging device moves in the optical axis direction by a driving force of a stepping motor.

11. The imaging unit according to claim 1, wherein the solid-state imaging device is moved in an optical axis direction and focusing is performed,
the solid-state imaging device is moved in the optical axis direction at zooming, and
at focusing and zooming, the solid-state imaging device moves in the optical axis direction by a driving force of a linear motor.

12. An imaging unit comprising:
a first lens group having positive refractive power;
a second lens group having negative refractive power;
a third lens group having positive refractive power; and
a solid-state imaging device that images an optical image formed by the first lens group to the third lens group sequentially arranged from an object side toward an image side,
wherein, at zooming from a wide-angle end to a telephoto end, a distance between the first lens group and the second lens group becomes larger and a distance between the second lens group and the third lens group becomes smaller, and
a distance from the second lens group to the solid-state imaging device at the wide-angle end is the longest of all zoom positions,
wherein the following condition expression (1) is satisfied $$0.45 < f3/(fw \cdot ft)^{1/2} < 0.70 \tag{1}$$

where
f3: focal length of third lens group
fw: focal length of whole optical system at wide-angle end
ft: focal length of whole optical system at telephoto end.

13. An imaging unit comprising:
a first lens group having positive refractive power;
a second lens group having negative refractive power;
a third lens group having positive refractive power; and
a solid-state imaging device that images an optical image formed by the first lens group to the third lens group sequentially arranged from an object side toward an image side,
wherein, at zooming from a wide-angle end to a telephoto end, a distance between the first lens group and the second lens group becomes larger and a distance between the second lens group and the third lens group becomes smaller, and
a distance from the second lens group to the solid-state imaging device at the wide-angle end is the longest of all zoom positions,
wherein the following condition expression (2) is satisfied $$-0.50 < f2/(fw \cdot ft)^{1/2} < -0.30 \tag{2}$$

where
f2: focal length of second lens group
fw: focal length of whole optical system at wide-angle end
ft: focal length of whole optical system at telephoto end.

14. An imaging unit comprising:
a first lens group having positive refractive power;
a second lens group having negative refractive power;
a third lens group having positive refractive power; and
a solid-state imaging device that images an optical image formed by the first lens group to the third lens group sequentially arranged from an object side toward an image side,
wherein, at zooming from a wide-angle end to a telephoto end, a distance between the first lens group and the second lens group becomes larger and a distance between the second lens group and the third lens group becomes smaller, and
a distance from the second lens group to the solid-state imaging device at the wide-angle end is the longest of all zoom positions,
wherein the following condition expression (4) is satisfied $$0.8 < f23t/ft < 3.5 \tag{4}$$

where
f23t: combined focal length of second lens group and third lens group at telephoto end
ft: focal length of whole optical system at telephoto end.

15. An imaging apparatus comprising:
a zoom lens including a first lens group having positive refractive power, a second lens group having negative refractive power, a third lens group having positive refractive power sequentially arranged from an object side toward an image side;
a solid-state imaging device that images an optical image formed by the zoom lens;
an input unit having switches with which operations are performed; and
a drive control unit that controls driving of at least the zoom lens,
wherein, the second lens group is disposed in a fixed, stationary position on the optical axis and between the first lens group and the third lens group and the third lens group is disposed between the second lens group and the solid-state imaging device,
wherein the first lens group, the third lens group and the solid-state imaging device are movable along the optical axis and relative to the second lens group in the fixed, stationary position to and between a wide-angle end state and a telephoto end state and
wherein, at the wide-angle end state, the solid-state imaging device is disposed apart from the second lens group at a first distance and while zooming from the wide-angle end state to the telephoto end state, the first lens group moves away from the second lens group, the third lens group moves towards the second lens group and the solid-state imaging device moves along the optical axis into a solid-state imaging device position disposed away from the second lens group at a second distance being less than the first distance,
wherein the first lens group includes a first lens group cemented lens formed by cementing a first lens group negative lens having a meniscus shape with a first lens group negative lens convex surface directed toward the object side and a first lens group first positive lens having a meniscus shape with a first lens group first positive lens convex surface directed toward the object side and a first lens group second positive lens having a meniscus shape with a first lens group second positive lens convex surface directed toward the object side and sequentially arranged from the object side toward the image side, wherein the second lens group includes a second lens group first negative lens having a meniscus shape with a second lens group first negative lens concave surface directed toward the image side and a second lens group cemented lens formed by cementing a second lens group second negative lens having a meniscus shape with a second lens group second negative lens concave surface directed toward the object side and a second lens group positive lens having a meniscus shape with a second lens group positive lens convex surface directed toward the object side and sequentially arranged from the object side toward the image side and wherein the third lens group includes a third lens group cemented lens formed by cementing a third lens group first positive lens having a meniscus shape with a third lens group first positive lens convex surface directed toward the object side and a third lens group first negative lens having a meniscus shape with a third lens group first negative lens concave surface directed toward the object side, a third lens group second positive lens having a biconvex shape and a third lens group second negative lens with a third lens group second negative lens concave surface directed toward the object side and sequentially arranged from the object side toward the image side.

* * * * *